US012309775B2

(12) United States Patent
Rico Alvarino et al.

(10) Patent No.: US 12,309,775 B2
(45) Date of Patent: May 20, 2025

(54) FLEXIBLE SIGNALING FOR ACKNOWLEDGMENT FEEDBACK DELAY AND DOWNLINK SCHEDULING DELAY

(71) Applicant: QUALCOMM Incorporated, San Diego, CA (US)

(72) Inventors: Alberto Rico Alvarino, San Diego, CA (US); Le Liu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 17/747,897

(22) Filed: May 18, 2022

(65) Prior Publication Data
US 2022/0377774 A1    Nov. 24, 2022

Related U.S. Application Data

(60) Provisional application No. 63/190,612, filed on May 19, 2021.

(51) Int. Cl.
*H04W 72/1273* (2023.01)
*H04L 5/00* (2006.01)
(Continued)

(52) U.S. Cl.
CPC ....... *H04W 72/1273* (2013.01); *H04L 5/0053* (2013.01); *H04W 72/0446* (2013.01); *H04W 72/23* (2023.01)

(58) Field of Classification Search
CPC .. H04L 5/0053; H04W 4/46; H04W 72/1273; H04W 72/23
See application file for complete search history.

(56) References Cited

U.S. PATENT DOCUMENTS

2019/0268207 A1\* 8/2019 Al-Imari ............... H04L 5/0053
2021/0105101 A1   4/2021 Wei et al.
(Continued)

OTHER PUBLICATIONS

ZTE, "Support additional PDSCH scheduling delay for introduction of 14-HARQ processes in DL for eMTC," R1-2100568, 3GPP TSG RAN WG1 #104/e, e-Meeting, Jan. 25-Feb. 5, 2021 (Year: 2021).*
(Continued)

*Primary Examiner* — Brian P Cox
(74) *Attorney, Agent, or Firm* — Holland & Hart LLP

(57) ABSTRACT

Methods, systems, and devices for wireless communications are described. A downlink shared channel scheduling delay and an acknowledgment feedback delay may be jointly encoded and sent to a user equipment (UE). For example, a downlink control information (DCI) field may jointly indicate the downlink shared channel scheduling delay and the acknowledgment feedback delay in a field of 'X' bits, where 'X' is configurable by a base station (e.g., via radio resource control (RRC) signaling). Subsequently, the UE may then determine the downlink shared channel scheduling delay and the acknowledgment feedback delay from the DCI by using respective equations based on a value from the jointly encoded indication or by using a table based on the value from the jointly encoded indication. Additionally, the downlink shared channel scheduling delay and the acknowledgment feedback delay may be expressed in terms of absolute subframes, invalid/valid subframes, or both.

28 Claims, 17 Drawing Sheets

(51) Int. Cl.
　　　H04W 72/0446　　(2023.01)
　　　H04W 72/23　　　(2023.01)

(56) References Cited

U.S. PATENT DOCUMENTS

2022/0376836 A1\*　11/2022　Cheng .................. H04L 1/1887
2023/0144930 A1\*　5/2023　Bhatoolaul ........... H04L 1/1854
　　　　　　　　　　　　　　　　　　　　　　　　　370/328

OTHER PUBLICATIONS

Huawei et al., "Support of 14-HARQ Processes in DL for HD-FDD MTC UEs", 3GPP TSG RAN WG1 Meeting #105-e, R1-2104289, 3rd Generation Partnership Project, Mobile Competence Centre, 650, Route Des Lucioles, F-06921 Sophia-Antipolis Cedex, France, vol. RAN WG1, No. E-meeting, May 10, 2021-May 27, 2021 May 12, 2021, XP052010743, 4 Pages, p. 3-p. 4.
International Search Report and Written Opinion—PCT/US2022/030006—ISA/EPO—Sep. 1, 2022 (2105244WO).
Qualcomm Incorporated: "Support of 14 HARQ Processes and Scheduling Delay", 3GPP TSG RAN WG1 #104-e, R1-2101510, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021 Jan. 19, 2021, XP051971671, pp. 1-9, p. 1 p. 4 p. 8-p. 9.

\* cited by examiner

FLEXIBLE SIGNALING FOR ACKNOWLEDGMENT FEEDBACK DELAY AND DOWNLINK SCHEDULING DELAY

CROSS REFERENCE

The present Application for Patent claims the benefit of U.S. Provisional patent application Ser. No. 63/190,612 by RICO ALVARINO et al., entitled "FLEXIBLE SIGNALING FOR ACKNOWLEDGMENT FEEDBACK DELAY AND DOWNLINK SCHEDULING DELAY," filed May 19, 2021, assigned to the assignee hereof, and expressly incorporated by reference herein.

FIELD OF TECHNOLOGY

The following relates to wireless communications, including flexible signaling for acknowledgment feedback delay and downlink scheduling delay.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some cases, a base station may indicate to a UE when a subsequent downlink message starts relative to a preceding downlink message or channel based on a delay value. Techniques are desired for efficient signaling of delay values.

SUMMARY

The described techniques relate to improved methods, systems, devices, and apparatuses that support flexible signaling for acknowledgment feedback delay and downlink scheduling delay. Generally, the described techniques provide for a user equipment (UE) to receive a jointly encoded indication for a downlink shared channel scheduling delay and an acknowledgment feedback delay. In some examples, the UE may receive a control message (e.g., via radio resource control (RRC) signaling) that includes an indication of a length (e.g., number of bits) for a downlink control information (DCI) field used for conveying the jointly encoded indication. Subsequently, the UE may receive a DCI that includes the DCI field with the jointly encoded indication, determine the downlink shared channel scheduling delay and the acknowledgment feedback delay from the jointly encoded indication, receive a downlink shared channel based on the downlink shared channel scheduling delay, and transmit acknowledgment feedback based on the acknowledgment feedback delay. In some examples, the UE may determine the downlink shared channel scheduling delay and the acknowledgment feedback delay based on performing respective equations using a value conveyed by the jointly encoded indication or based on a lookup table.

A method for wireless communications at a UE is described. The method may include receiving, from a network device, a control message including an indication of a length of a number of bits for a DCI field, the DCI field including a jointly encoded indication for a downlink shared channel scheduling delay and an acknowledgment feedback delay, receiving, from the network device based on the control message, DCI including the DCI field, receiving, from the network device, a downlink shared channel based on the downlink shared channel scheduling delay, and transmitting, to the network device, acknowledgment feedback based on the acknowledgment feedback delay.

An apparatus for wireless communications at a UE is described. The apparatus may include at least one processor, memory coupled with the at least one processor, the memory storing instructions executable by the at least one processor to cause the UE to receive, from a network device, a control message including an indication of a length of a number of bits for a DCI field, the DCI field including a jointly encoded indication for a downlink shared channel scheduling delay and an acknowledgment feedback delay, receive, from the network device based on the control message, DCI including the DCI field, receive, from the network device, a downlink shared channel based on the downlink shared channel scheduling delay, and transmit, to the network device, acknowledgment feedback based on the acknowledgment feedback delay.

Another apparatus for wireless communications at a UE is described. The apparatus may include means for receiving, from a network device, a control message including an indication of a length of a number of bits for a DCI field, the DCI field including a jointly encoded indication for a downlink shared channel scheduling delay and an acknowledgment feedback delay, means for receiving, from the network device based on the control message, DCI including the DCI field, means for receiving, from the network device, a downlink shared channel based on the downlink shared channel scheduling delay, and means for transmitting, to the network device, acknowledgment feedback based on the acknowledgment feedback delay.

A non-transitory computer-readable medium storing code for wireless communications at a UE is described. The code may include instructions executable by a processor to receive, from a network device, a control message including an indication of a length of a number of bits for a DCI field, the DCI field including a jointly encoded indication for a downlink shared channel scheduling delay and an acknowledgment feedback delay, receive, from the network device based on the control message, DCI including the DCI field, receive, from the network device, a downlink shared channel based on the downlink shared channel scheduling delay, and transmit, to the network device, acknowledgment feedback based on the acknowledgment feedback delay.

In some examples of the method, apparatuses, and non-transitory computer-readable medium described herein, receiving the DCI including the DCI field may include operations, features, means, or instructions for receiving the DCI field including a single value, where the single value may be based on a first index for the downlink shared channel scheduling delay and a second index for the acknowledgment feedback delay and determining the downlink shared channel scheduling delay and the acknowledgment feedback delay based on the single value.

In some examples of the method, apparatuses, and non-transitory computer-readable medium described herein, determining the downlink shared channel scheduling delay and the acknowledgment feedback delay may include operations, features, means, or instructions for performing a first calculation using the single value to determine the downlink shared channel scheduling delay and performing a second calculation using the single value to determine the acknowledgment feedback delay.

In some examples of the method, apparatuses, and non-transitory computer-readable medium described herein, determining the downlink shared channel scheduling delay and the acknowledgment feedback delay may include operations, features, means, or instructions for determining the downlink shared channel scheduling delay and the acknowledgment feedback delay based on a table including a first set of multiple downlink shared channel scheduling delay values and a second set of multiple acknowledgment feedback delay values, where the single value indicates a row of the table corresponding to the downlink shared channel scheduling delay and the acknowledgment feedback delay.

In some examples of the method, apparatuses, and non-transitory computer-readable medium described herein, receiving the DCI including the DCI field may include operations, features, means, or instructions for receiving the DCI field including a first value corresponding to the downlink shared channel scheduling delay, a second value, and a third value, where the acknowledgment feedback delay may be determined based on the second value and the third value.

In some examples of the method, apparatuses, and non-transitory computer-readable medium described herein, the DCI field including the first value, the second value, and the third value may be received based on the downlink shared channel scheduling delay and the acknowledgment feedback delay including a number of bandwidth limited low complexity/coverage enhancement (BL/CE) transmission time intervals (TTIs).

In some examples of the method, apparatuses, and non-transitory computer-readable medium described herein, receiving the control message may include operations, features, means, or instructions for receiving the control message including the indication of the length of the number of bits for the DCI field via RRC signaling.

In some examples of the method, apparatuses, and non-transitory computer-readable medium described herein, the number of bits may be based on the downlink shared channel scheduling delay and the acknowledgment feedback delay including a number of absolute transmission time intervals or including a number of BL/CE TTIs.

In some examples of the method, apparatuses, and non-transitory computer-readable medium described herein, the number of bits includes five bits, six bits, or seven bits.

In some examples of the method, apparatuses, and non-transitory computer-readable medium described herein, the downlink shared channel scheduling delay and the acknowledgment feedback delay include a number of absolute TTIs, a number of BL/CE TTIs, or a combination thereof.

In some examples of the method, apparatuses, and non-transitory computer-readable medium described herein, the UE includes a machine type communication (MTC) device.

A method for wireless communications at a network device is described. The method may include transmitting, to a UE, a control message including an indication of a length of a number of bits for a DCI field, the DCI field including a jointly encoded indication for a downlink shared channel scheduling delay and an acknowledgment feedback delay, transmitting, to the UE based on the control message, DCI including the DCI field, transmitting, to the UE, a downlink shared channel based on the downlink shared channel scheduling delay, and receiving, from the UE, acknowledgment feedback based on the acknowledgment feedback delay.

An apparatus for wireless communications at a network device is described. The apparatus may include at least one processor, memory coupled with the processor, and instructions stored in the memory. The instructions may be executable by the at least one processor to cause the network device to transmit, to a UE, a control message including an indication of a length of a number of bits for a DCI field, the DCI field including a jointly encoded indication for a downlink shared channel scheduling delay and an acknowledgment feedback delay, transmit, to the UE based on the control message, DCI including the DCI field, transmit, to the UE, a downlink shared channel based on the downlink shared channel scheduling delay, and receive, from the UE, acknowledgment feedback based on the acknowledgment feedback delay.

Another apparatus for wireless communications at a network device is described. The apparatus may include means for transmitting, to a UE, a control message including an indication of a length of a number of bits for a DCI field, the DCI field including a jointly encoded indication for a downlink shared channel scheduling delay and an acknowledgment feedback delay, means for transmitting, to the UE based on the control message, DCI including the DCI field, means for transmitting, to the UE, a downlink shared channel based on the downlink shared channel scheduling delay, and means for receiving, from the UE, acknowledgment feedback based on the acknowledgment feedback delay.

A non-transitory computer-readable medium storing code for wireless communications at a network device is described. The code may include instructions executable by a processor to transmit, to a UE, a control message including an indication of a length of a number of bits for a DCI field, the DCI field including a jointly encoded indication for a downlink shared channel scheduling delay and an acknowledgment feedback delay, transmit, to the UE based on the control message, DCI including the DCI field, transmit, to the UE, a downlink shared channel based on the downlink shared channel scheduling delay, and receive, from the UE, acknowledgment feedback based on the acknowledgment feedback delay.

In some examples of the method, apparatuses, and non-transitory computer-readable medium described herein, transmitting the DCI including the DCI field may include operations, features, means, or instructions for transmitting the DCI field including a single value, the single value calculated based on a first index for the downlink shared channel scheduling delay and a second index for the acknowledgment feedback delay, where the downlink shared channel scheduling delay and the acknowledgment feedback delay may be indicated based on the single value.

In some examples of the method, apparatuses, and non-transitory computer-readable medium described herein, the downlink shared channel scheduling delay and the acknowledgment feedback delay may be indicated based on a table including a first set of multiple downlink shared channel scheduling delay values and a second set of multiple acknowledgment feedback delay values, the single value indicating a row of the table corresponding to the downlink shared channel scheduling delay and the acknowledgment feedback delay.

In some examples of the method, apparatuses, and non-transitory computer-readable medium described herein, transmitting the DCI including the DCI field may include operations, features, means, or instructions for transmitting the DCI field including a first value corresponding to the downlink shared channel scheduling delay, a second value, and a third value, where the acknowledgment feedback delay may be indicated based on the second value and the third value.

In some examples of the method, apparatuses, and non-transitory computer-readable medium described herein, the DCI field including the first value, the second value, and the third value may be transmitted based on the downlink shared channel scheduling delay and the acknowledgment feedback delay including a number of BL/CE TTIs.

In some examples of the method, apparatuses, and non-transitory computer-readable medium described herein, transmitting the control message may include operations, features, means, or instructions for transmitting the control message including the indication of the length of the number of bits for the DCI field via RRC signaling.

In some examples of the method, apparatuses, and non-transitory computer-readable medium described herein, the number of bits may be based on the downlink shared channel scheduling delay and the acknowledgment feedback delay including a number of absolute TTIs or including a number of BL/CE TTIs.

In some examples of the method, apparatuses, and non-transitory computer-readable medium described herein, the number of bits includes five bits, six bits, or seven bits.

In some examples of the method, apparatuses, and non-transitory computer-readable medium described herein, the downlink shared channel scheduling delay and the acknowledgment feedback delay include a number of absolute TTIs, a number of BL/CE TTIs, or a combination thereof.

In some examples of the method, apparatuses, and non-transitory computer-readable medium described herein, the UE includes an MTC device.

DETAILED DESCRIPTION

Figure 1:
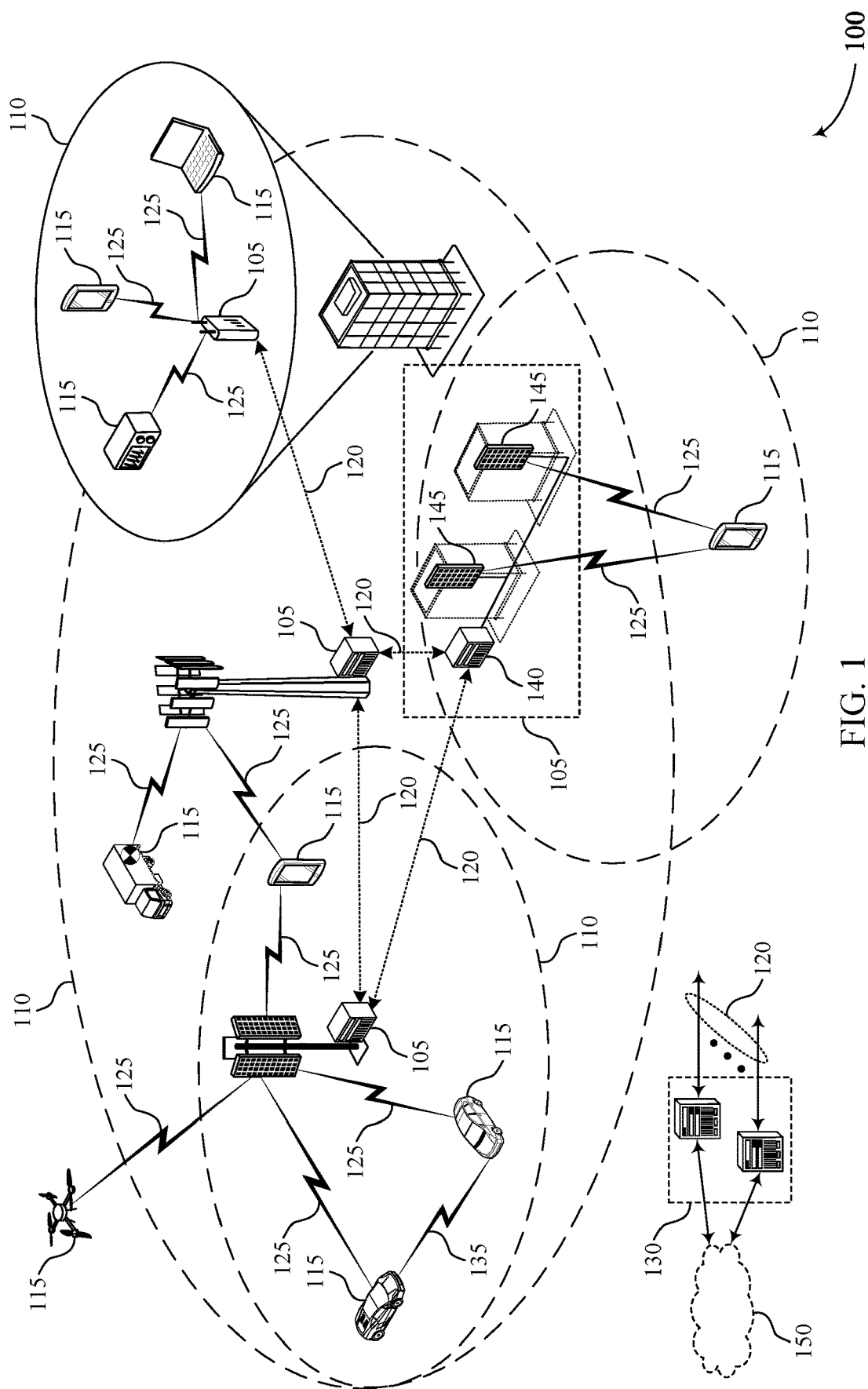
FIG. 1 illustrates an example of a wireless communications system that supports flexible signaling for acknowledgment feedback delay and downlink scheduling delay in accordance with aspects of the present disclosure.

In some wireless communications systems, a base station may indicate to a user equipment (UE) when a subsequent downlink shared channel (e.g., a physical downlink shared channel (PDSCH)) starts relative to a preceding downlink control channel (e.g., a physical downlink control channel (PDCCH)). For example, the base station may indicate a downlink shared channel scheduling delay between the preceding downlink control channel and the subsequent downlink shared channel, where the downlink shared channel scheduling delay can be one of three different possibilities (e.g., defined in the standards). In some examples, the base station may transmit an indication of the downlink shared channel scheduling delay in downlink control information (DCI).

Additionally, this DCI may also include an acknowledgment feedback delay to indicate when the UE is to transmit acknowledgment feedback (e.g., hybrid automatic repeat request (HARQ) acknowledgment feedback, such as acknowledgment (ACK)/negative acknowledgment (NACK) feedback, HARQ-ACK feedback, or HARQ ACK/NACK feedback) to the base station (e.g., for the preceding downlink control channel, a preceding downlink shared channel, or an additional downlink channel). The acknowledgment feedback delay may include three bits to indicate different delay values. However, in some cases, the three bits may not be enough to indicate possible acknowledgment feedback delays, and the separate indications of the downlink shared channel scheduling delay and the acknowledgment feedback delay may unnecessarily increase signaling overhead.

As described herein, the base station may jointly encode the downlink shared channel scheduling delay and the acknowledgment feedback delay (e.g., within one DCI field) and transmit this joint indication to the UE. For example, the DCI may jointly indicate the downlink shared channel scheduling delay and the acknowledgment feedback delay in a field of 'X' bits, where 'X' is configurable by the base station (e.g., via radio resource control (RRC) signaling). In some examples, 'X' may be equal to five (5) bits, six (6) bits, or seven (7) bits. Subsequently, the UE may then determine the downlink shared channel scheduling delay and the acknowledgment feedback delay from the DCI using different options. In a first option, the UE may determine the downlink shared channel scheduling delay and the acknowledgment feedback delay based on respective equations. For example, if a value 'N' is signaled in the DCI, a first equation (e.g., N mod 3) may determine the downlink shared channel scheduling delay, and a second equation (e.g., N div 3) may determine the acknowledgment delay.

Additionally, or alternatively, in another option the UE may determine the downlink shared channel scheduling delay and the acknowledgment feedback delay based on a table (e.g., specified in the standards). For example, for each signaled value 'N,' two columns in the table may indicate the downlink shared channel scheduling delay and the acknowledgment feedback delay, respectively. In some examples, the downlink shared channel scheduling delay and the acknowledgment feedback delay may be expressed in terms of absolute subframes, bandwidth limited low complexity/coverage enhancement (BL/CE) subframes (e.g., valid/invalid subframes), or both. Additionally, the downlink shared channel scheduling delay and the acknowledgment feedback delay (e.g., based on absolute subframes, BL/CE subframes, or both) may be indicated differently for different numbers of bits.

Aspects of the disclosure are initially described in the context of wireless communications systems. Additionally, aspects of the disclosure are illustrated through an additional wireless communications system, a delay configuration, and a process flow. Aspects of the disclosure are further illustrated by and described with reference to apparatus diagrams, system diagrams, and flowcharts that relate to flexible signaling for acknowledgment feedback delay and downlink scheduling delay.

FIG. 1 illustrates an example of a wireless communications system 100 that supports flexible signaling for acknowledgment feedback delay and downlink scheduling delay in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., global navigation satellite system (GNSS) devices based on, for example, global positioning system (GPS), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or more multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As described previously, a UE 115 may support MTC (e.g., or enhanced MTC (eMTC)) for communicating with a base station 105. In some cases, the MTC or eMTC may include, support, or use multiple HARQ processes (e.g., 14 HARQ processes). Additionally, the MTC or eMTC may support scheduling PDSCHs across "half-duplex bursts." In some examples, for scheduling the PDSCHs across "half-duplex bursts," a PDSCH scheduling delay (e.g., downlink shared channel scheduling delay) may be used for a physical uplink control channel (PUCCH) non-repetition case (e.g., PUCCH repetitions=1). The PDSCH scheduling delay may include a number of subframes (e.g., or different length TTI) between receiving a PDCCH scheduling a PDSCH (e.g., in a first "half-duplex burst") and receiving the scheduled PDSCH (e.g., in a second "half-duplex burst"), where the "half-duplex bursts" may include bursts that are allocated to downlink communications alone or uplink communications alone. The scheduling of the PDSCHs across "half-duplex bursts" is described in more detail with reference to FIG. 3.

In some examples, the PDSCH scheduling delay may be given as two (2) BL/CE downlink subframes or a PDSCH scheduling delay of seven (7) subframes. For the PDSCH scheduling delay of seven (7) subframes, the seven (7) subframes may be given as 1 BL/CE downlink subframe+1 subframe+3 BL/CE uplink subframes+1 subframe+1 BL/CE downlink subframe (e.g., a first option or version for the seven (7) subframes, or '7v1') or given as 1 subframe+3 BL/CE uplink subframes+1 subframe+2 BL/CE downlink subframes (e.g., a second version for the seven (7) subframes, or '7v2'). Accordingly, there may be three (3) possibilities for the PDSCH scheduling delay including the two (2) BL/CE downlink subframes, the '7v1' option, and the '7v2' option.

A base station 105 may indicate one of these options for a UE 115 to use to receive a PDSCH via signaling in a DCI, where the delay is applied after receiving the DCI (e.g., in a PDCCH) to then receive the corresponding PDSCH (e.g., scheduled or indicated by the DCI). For example, the base station 105 may indicate the PDSCH scheduling delay option using two (2) bits in the DCI. However, because there are three (3) options or values for the PDSCH scheduling delay, one combination that can be represented with the two (2) bits may be wasted (e.g., two (2) bits result in four (4) possibilities, such as '00,' '01,' '10,' and '11,' but three (3) of those possibilities are used for the three (3) options or values for the PDSCH scheduling delay, leaving a fourth possibility unused).

Additionally, the DCI may indicate a HARQ-ACK delay (e.g., acknowledgment feedback delay) for indicating when the UE 115 is to transmit acknowledgment feedback for the scheduled PDSCH from the DCI, where the HARQ-ACK delay includes a number of subframes between receiving the DCI and then transmitting HARQ-ACK feedback indicating whether the scheduled PDSCH is successfully received or not. Depending on the presence of BL/CE uplink and downlink subframes (e.g., valid/invalid subframes), HARQ-ACK delays to achieve peak data rate may be different. The BL/CE uplink and downlink subframes may represent subframes that are configured for MTC communications and may not include invalid subframes (e.g., subframes reserved by the base station 105 for other communications, such as broadcasting information or low latency communications). That is, in some examples, BL/CE uplink and downlink subframes may not represent an absolute number of subframes, where two (2) BL/CE uplink and/or downlink subframes may include more than two (2) absolute subframes if invalid/reserved subframes are present in between the two (2) BL/CE uplink and/or downlink subframes.

In some examples, the HARQ-ACK delay may be represented to the UE 115 in the DCI using three (3) bits. Table 1 represents different HARQ-ACK delay values for the different possibilities of the three (3) bits based on a value of a control element for scheduling enhancement.

TABLE 1

HARQ-ACK Delay Values from DCI

| 'HARQ-ACK delay' Field in DCI | HARQ-ACK Delay Value when 'ce-SchedulingEnhancement' is set to 'range1' | HARQ-ACK delay value when 'ce-SchedulingEnhancement' set to 'range2' or 'ce-SchedulingEnhancement' is not configured and 'ce-HARQ-AckBundling' is set |
|---|---|---|
| 000 | 4 | 4 |
| 001 | 5 | 5 |
| 010 | 7 | 6 |
| 011 | 9 | 7 |
| 100 | 11 | 8 |
| 101 | 13 | 9 |
| 110 | 15 | 10 |
| 111 | 17 | 11 |

However, in some cases, the three (3) bits for the HARQ-ACK delay values may not be enough to indicate all possible HARQ-ACK delays. Additionally, the separate indications of the PDSCH scheduling delay and the HARQ-ACK delay in the DCI may unnecessarily increase signaling overhead.

Wireless communications system 100 may support efficient signaling of a downlink shared channel scheduling delay (e.g., PDSCH scheduling delay) and an acknowledgment feedback delay (e.g., HARQ-ACK delay). For example, the downlink shared channel scheduling delay and the acknowledgment feedback delay may be jointly encoded (e.g., within one DCI field) and sent to a UE 115. Accordingly, a DCI may jointly indicate the downlink shared channel scheduling delay and the acknowledgment feedback delay in a field of 'X' bits, where 'X' is configurable by a base station 105 (e.g., via RRC signaling). Subsequently, the UE 115 may then determine the downlink shared channel scheduling delay and the acknowledgment feedback delay from the DCI using different options. In a first option, the UE may determine the downlink shared channel scheduling delay and the acknowledgment feedback delay based on respective equations. In another option, the UE may determine the downlink shared channel scheduling delay and the acknowledgment feedback delay based on a table (e.g., lookup table). Additionally, the downlink shared channel scheduling delay and the acknowledgment feedback delay may be expressed in terms of absolute subframes, BL/CE subframes, or both.

Figure 2:
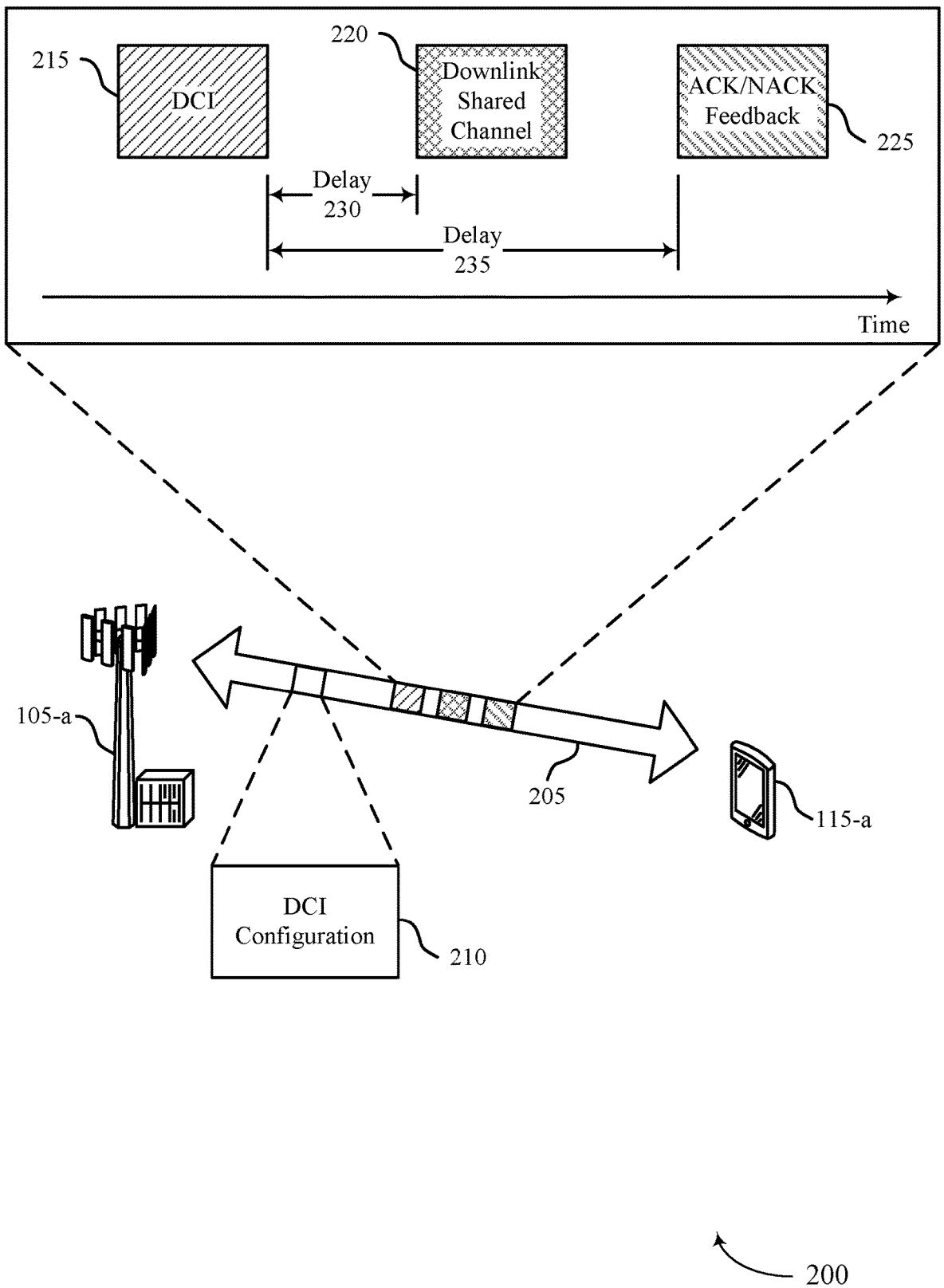
FIG. 2 illustrates an example of a wireless communications system that supports flexible signaling for acknowledgment feedback delay and downlink scheduling delay in accordance with aspects of the present disclosure.

FIG. 2 illustrates an example of a wireless communications system 200 that supports flexible signaling for acknowledgment feedback delay and downlink scheduling delay in accordance with aspects of the present disclosure. In some examples, wireless communications system 200 may implement aspects of or may be implemented by aspects of wireless communications system 100. For example, wireless communications system 200 may include a base station 105-a and a UE 115-a, which may represent examples of corresponding base stations 105 and UEs 115, respectively, as described with reference to FIG. 1. In some examples, base station 105-a and UE 115-a may both support MTC and/or eMTC, such that both devices may be referred to as MTC or eMTC devices. Additionally, base station 105-a and UE 115-a may communicate control information, data, or both using resources of a carrier 205.

As described herein, base station 105-a may jointly encode a downlink shared channel scheduling delay (e.g., PDSCH scheduling delay) and an acknowledgment feedback delay (e.g., HARQ-ACK delay or ACK/NACK feedback delay) and transmit this jointly encoded indication to UE 115-a to support or enable communications on the resources of carrier 205. For example, base station 105-a may transmit the jointly encoded indication within a single DCI field to UE 115-a. In some examples, a length of the single DCI field may be configurable and indicated to UE 115-a. For example, base station 105-a may transmit a DCI configuration 210 (e.g., via RRC signaling) to UE 115-a that includes different configuration parameters for a DCI 215 that includes the single DCI field, such as the length (e.g., as a number of bits) of the single DCI field among additional parameters.

Subsequently, UE 115-a may receive DCI 215 from base station 105-a and may determine the downlink shared channel scheduling delay and the acknowledgment feedback delay from DCI 215 based on the jointly encoded indication using DCI configuration 210. For example, DCI 215 may jointly indicate the downlink shared channel scheduling delay (e.g., from the three (3) possibilities discussed previously, such as two (2) BL/CE downlink subframes, the '7v1' option, and the '7v2' option) and the acknowledgment feedback delay in a field of 'X' bits (e.g., where the length of the 'X' bits is configured by DCI configuration 210). When X=5 bits (e.g., as indicated in DCI configuration 210), 10 different acknowledgment feedback delays (e.g., from 4 to 13 subframes) may be associated with each downlink shared channel scheduling delay possibility. When X=6 bits, 21 different acknowledgment feedback delays (e.g., from 4 to 24 subframes) may be associated with each downlink shared channel scheduling delay possibility. When X=7 bits, 42 different acknowledgment feedback delays (e.g., from 4 to 45 subframes) may be associated with each downlink shared channel scheduling delay possibility.

After receiving DCI 215, UE 115-a may then determine respective delay values for the downlink shared channel scheduling delay and the acknowledgment feedback delay based on the jointly encoded indication. In some examples, UE 115-a may determine each delay value by using a respective equation. For example, if a value 'N' is signaled in DCI 215 (e.g., the value 'N' is given by the jointly encoded indication), a first equation using 'N' may express or result in the downlink shared channel scheduling delay (e.g., N mod 3, where the mod operation returns a remainder from dividing 'N' by 3, such as 7 mod 3 would return 1 based on 7 divided by 3 having a quotient of 2 with a remainder of 1), and a second equation using 'N' may express or result in the acknowledgment feedback delay (e.g., N div 3, where the div operation returns a whole integer from dividing 'N' by 3, such as 7 div 3 would return 2 based on 3 going wholly into 7 twice).

Base station 105-a may determine the value of 'N' for the jointly encoded indication in the single DCI field of DCI 215 based on Equation 1:

$$\text{DCI field} = 3 * \langle\text{scheduling Delay index}\rangle + \langle\text{PDSCH delay index}\rangle \tag{1}$$

The scheduling delay index may correspond to an index value for the acknowledgment feedback delay, and the PDSCH delay index may correspond to an index value for the downlink shared channel scheduling delay.

Additionally, or alternatively, UE 115-a may determine each delay value by using a lookup table. For example, a table may be defined to associate different values indicated by the jointly encoded indication from the single DCI field in DCI 215 to corresponding downlink shared channel scheduling delays and the acknowledgment feedback delays in the table. For example, for each possible signaled value 'N' that can be indicated by the jointly encoded indication (e.g., based on a length of the single DCI field configured in DCI configuration 210), two columns in the table may define the downlink shared channel scheduling delays and the acknowledgment feedback delays that correspond to a given 'N' value.

In some examples, the downlink shared channel scheduling delay and the acknowledgment feedback delay may be expressed in terms of absolute subframes, BL/CE subframes, or a combination of both. Absolute subframes may include a number of subframes between receiving DCI 215 and performing corresponding communications (e.g., receiving downlink shared channel and/or transmitting acknowledgment feedback) regardless if the subframes are valid or invalid subframes. BL/CE subframes may include a number of valid subframes between receiving DCI 215 and performing the corresponding communications, where invalid subframes (e.g., such as subframes reserved by base station 105-a for other communications) are not included in the count of subframes indicated by the BL/CE subframes.

Additionally, UE 115-a may interpret the downlink shared channel scheduling delay and acknowledgment feedback delay (e.g., based on absolute subframes, BL/CE subframes, or combination of both) differently for different numbers of bits configured for the single DCI field in DCI 215 to convey the jointly encoded indication. For example, if X=5 (e.g., the single DCI field is five (5) bits in length), as described previously, 10 different acknowledgment feedback delays (e.g., from 4 to 13) may be associated with each downlink shared channel scheduling delay, where the delays may include a number of absolute subframes, BL/CE subframes, or combination of both.

Additionally, or alternatively, if X=6, the acknowledgment feedback delay may be given by 'y' that ranges from 4 to 13 (e.g., an absolute number of subframes) and may include the following subframe type if BL/CE subframes are counted:

$(y-z-1)BL/CE$ downlink subframe(s)+1 subframe+$z$ $BL/CE$ uplink sub frame(s)

where y=4-13 and z=1, 2, or 3. Accordingly, for X=6, base station 105-*a* may signal three (3) values: an option for the downlink shared channel scheduling delay (e.g., among the two (2) BL/CE subframes option, the '7v1' option, and the '7v2' option), a value for 'z,' and a value for 'y.' In some examples, base station 105-*a* may signal a subset of combinations of the different values because signaling all possible combinations would be larger than six (6) bits.

As shown in the example of FIG. 2, UE 115-*a* may receive DCI 215 scheduling a downlink shared channel 220 and an ACK/NACK feedback 225 (e.g., acknowledgment feedback). For example, ACK/NACK feedback 225 may be used by UE 115-*a* to indicate whether downlink shared channel 220 scheduled by DCI 215 is successfully received and decoded or not. Additionally, as described herein, UE 115-*a* may determine a delay 230 and a delay 235 based on a jointly encoded indication in a single DCI field of DCI 215. Delay 230 may correspond to a downlink shared channel scheduling delay that includes a number of subframes (e.g., absolute subframes, BL/CE subframes, or combination of both) between receiving DCI 215 and receiving downlink shared channel 220. Delay 235 may correspond to an acknowledgment feedback delay that includes a number of subframes between receiving DCI 215 and transmitting ACK/NACK feedback 225. Accordingly, UE 115-*a* may receive downlink shared channel 220 based on delay 230 and may transmit ACK/NACK feedback 225 based on delay 235.

Figure 3:
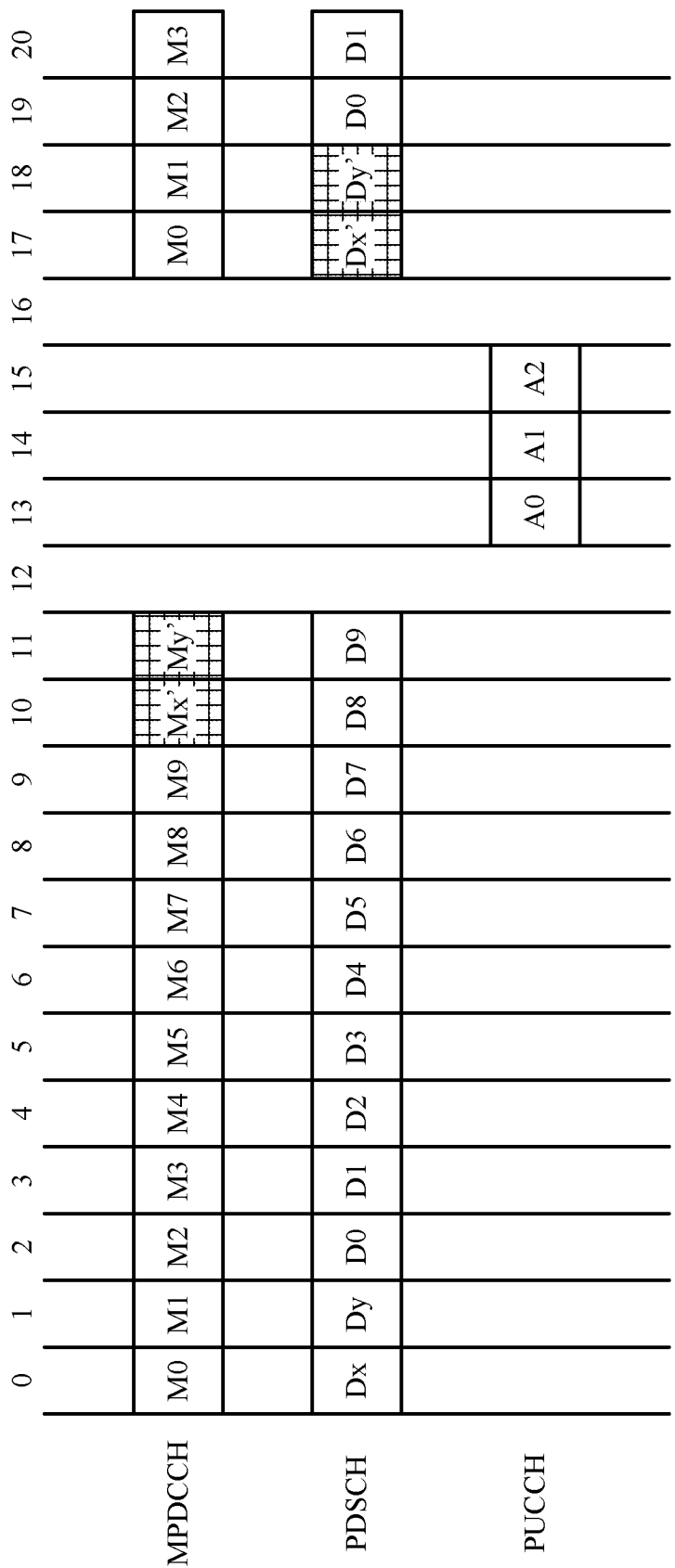
FIG. 3 illustrates an example of a delay configuration that supports flexible signaling for acknowledgment feedback delay and downlink scheduling delay in accordance with aspects of the present disclosure.

FIG. 3 illustrates an example of a delay configuration 300 in accordance with aspects of the present disclosure. In some examples, delay configuration 300 may implement aspects of or may be implemented by aspects of wireless communications system 100, wireless communications system 200, or both. For example, a base station 105 may use delay configuration 300 to transmit one or more downlink channels to a UE 115. In some examples, the base station 105 and the UE 115 may both support MTC and/or eMTC, such that both devices may be referred to as MTC or eMTC devices.

The base station 105 may transmit an MTC PDCCH (MPDCCH), a PDCCH, or another downlink control channel (the term MPDCCH is used here as an example) to the UE 115 that includes 10 subframes (e.g., blocks M0 to M9) and a PDSCH (e.g., downlink shared channel) that also includes 10 subframes (e.g., blocks D0 to D9). In some examples, the subframes occupied by the MPDCCH and the PDSCH may correspond to a first "half-duplex burst," where downlink communications alone are scheduled and communicated. After the first "half-duplex burst" ends (e.g., subframe 11), a subframe may be used to transition to a second "half-duplex burst" for scheduled and communicated uplink communications alone. For example, the UE 115 may transmit a PUCCH to the base station 105 during the second "half-duplex burst," where the PUCCH may carry acknowledgment feedback or additional uplink information in three (3) subframes (e.g., blocks A0 to A2) for a previously received downlink message or channel from the base station 105 (e.g., the MPDCCH, the PDSCH, or both).

Another subframe (e.g., subframe 16) may be used to transition to a third "half-duplex burst" for downlink communications (e.g., another MPDCCH and another PDSCH). In some examples, two last subframes of the MPDCCH in the first "half-duplex burst" may be used to indicate a delay between the given subframes and a start of a PDSCH in a subsequent "half-duplex burst" (e.g., in the third "half-duplex burst"). For example, a first of the last two subframes may include an Mx' block that includes a delay that corresponds to a first subframe of the subsequent PDSCH including a block Dx', and a second of the last two subframes may include an My' block that includes a delay that corresponds to a second subframe of the subsequent PDSCH including a block Dy'. The delay between the Mx' block and the Dx' block may be represented by the '7v1' option as described previously, and the delay between the My' block and the Dy' block may be represented by the '7v2' option as described previously. In some examples, the delays between the MPDCCH and the PDSCH may be determined by the UE 115 based on the techniques described herein (e.g., based on a DCI field transmitted in each of the Mx' block and the My' block), where a second delay between the MPDCCH and a subsequent PUCCH after the scheduled PDSCH may also be determined by the UE 115 (e.g., based on the same DCI field transmitted in each of the Mx' block and the My' block).

Figure 4:
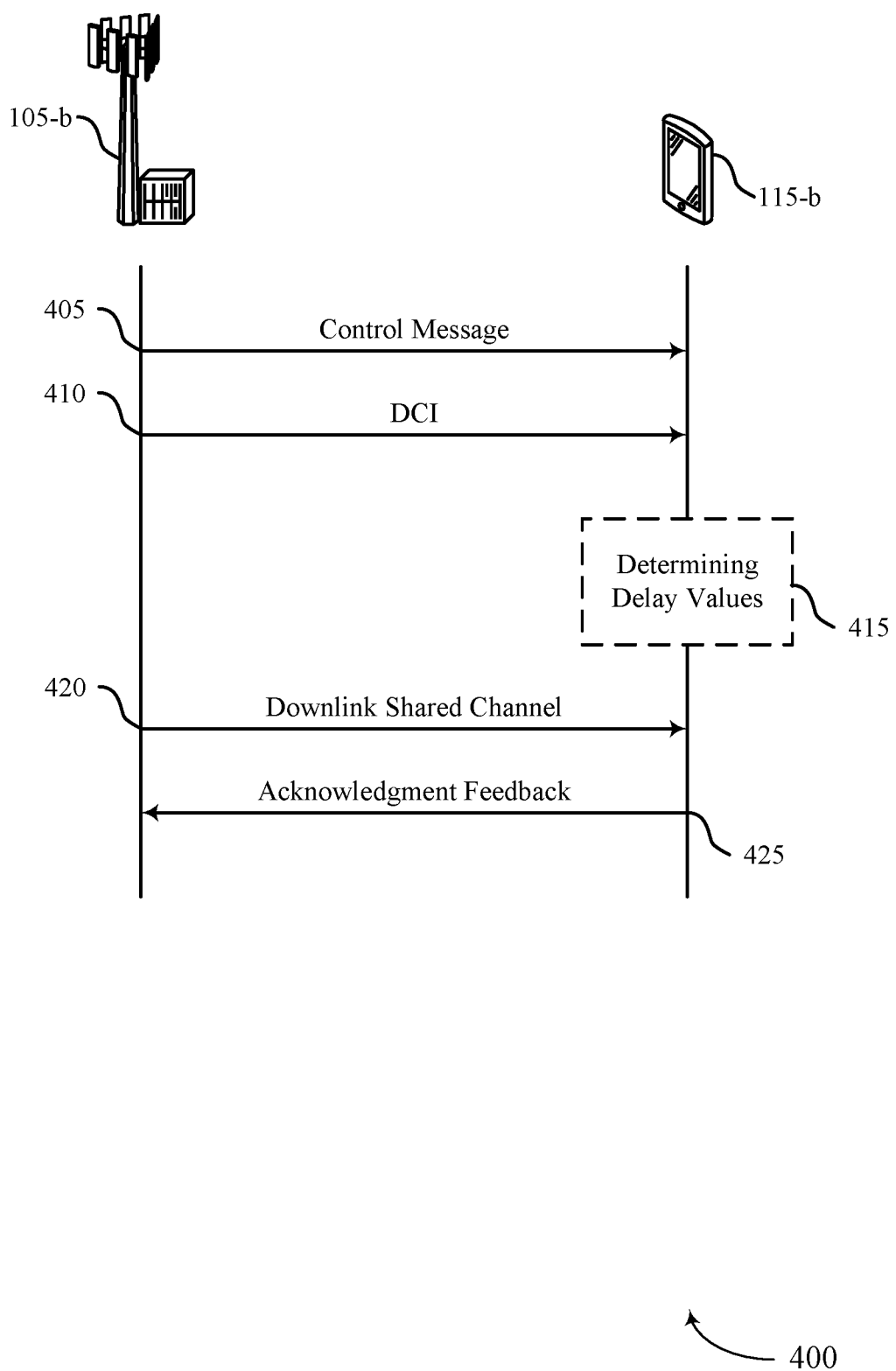
FIG. 4 illustrates an example of a process flow that supports flexible signaling for acknowledgment feedback delay and downlink scheduling delay in accordance with aspects of the present disclosure.

FIG. 4 illustrates an example of a process flow 400 that supports flexible signaling for acknowledgment feedback delay and downlink scheduling delay in accordance with aspects of the present disclosure. In some examples, process flow 400 may implement aspects of or may be implemented by aspects of wireless communications system 100, wireless communications system 200, or both. For example, process flow 400 may include a base station 105-*b* and a UE 115-*b*, which may represent examples of corresponding base stations 105 and UEs 115, respectively, as described with reference to FIGS. 1-3. In some examples, UE 115-*b* may represent an MTC device (e.g., an eMTC device).

In the following description of process flow 400, the operations between UE 115-*b* and base station 105-*b* may be performed in different orders or at different times. Certain operations may also be left out of process flow 400, or other operations may be added to process flow 400. It is to be understood that while UE 115-*b* and base station 105-*b* are shown performing a number of the operations of process flow 400, any wireless device may perform the operations shown.

At 405, UE 115-*b* may receive, from base station 105-*b*, a control message including an indication of a length of a number of bits for a DCI field, where the DCI field includes a jointly encoded indication for a downlink shared channel scheduling delay (e.g., PDSCH scheduling delay) and an acknowledgment feedback delay (e.g., HARQ-ACK delay). For example, UE 115-*b* may receive the control message including the indication of the length of the number of bits for the DCI field via RRC signaling. In some examples, the number of bits may be based on the downlink shared channel scheduling delay and the acknowledgment feedback delay including a number of absolute TTIs or including a number of BL/CE TTIs. For example, the downlink shared channel scheduling delay and the acknowledgment feedback delay may include a number of absolute TTIs, a number of BL/CE TTIs, or a combination thereof. Additionally, the number of bits may include five (5) bits, six (6) bits, or seven (7) bits.

At 410, UE 115-*b* may receive, from base station 105-*b* based on the control message, DCI including the DCI field. In some examples, UE 115-*b* may receive the DCI field including a single value, where the single value is based on a first index for the downlink shared channel scheduling delay and a second index for the acknowledgment feedback delay (e.g., as defined in Equation 1 as described with reference to FIG. 2). Additionally, or alternatively, UE 115-*b* may receive the DCI field including a first value corresponding to the downlink shared channel scheduling delay, a second value, and a third value. For example, the DCI field including the first value, the second value, and the third value may be received based on the downlink shared channel scheduling delay and the acknowledgment feedback delay including a number of BL/CE TTIs.

At 415, UE 115-b may determine the downlink shared channel scheduling delay and the acknowledgment feedback delay. For example, UE 115-b may determine each delay based on the single value, where UE 115-b performs a first calculation using the single value to determine the downlink shared channel scheduling delay and performs a second calculation using the single value to determine the acknowledgment feedback delay. Additionally, or alternatively, UE 115-b may determine the downlink shared channel scheduling delay and the acknowledgment feedback delay based on a table including a first set of downlink shared channel scheduling delay values and a second set of acknowledgment feedback delay values, where the single value indicates a row of the table corresponding to the downlink shared channel scheduling delay and the acknowledgment feedback delay. Additionally, or alternatively, when the DCI field includes the first, second, and third values, UE 115-b may determine the downlink shared channel scheduling delay based on the first value and may determine the acknowledgment feedback delay based on the second value and the third value.

At 420, UE 115-b may receive, from base station 105-b, a downlink shared channel based on the downlink shared channel scheduling delay. At 425, UE 115-b may transmit, to base station 105-b, acknowledgment feedback based on the acknowledgment feedback delay (e.g., for the downlink shared channel).

Figure 5:
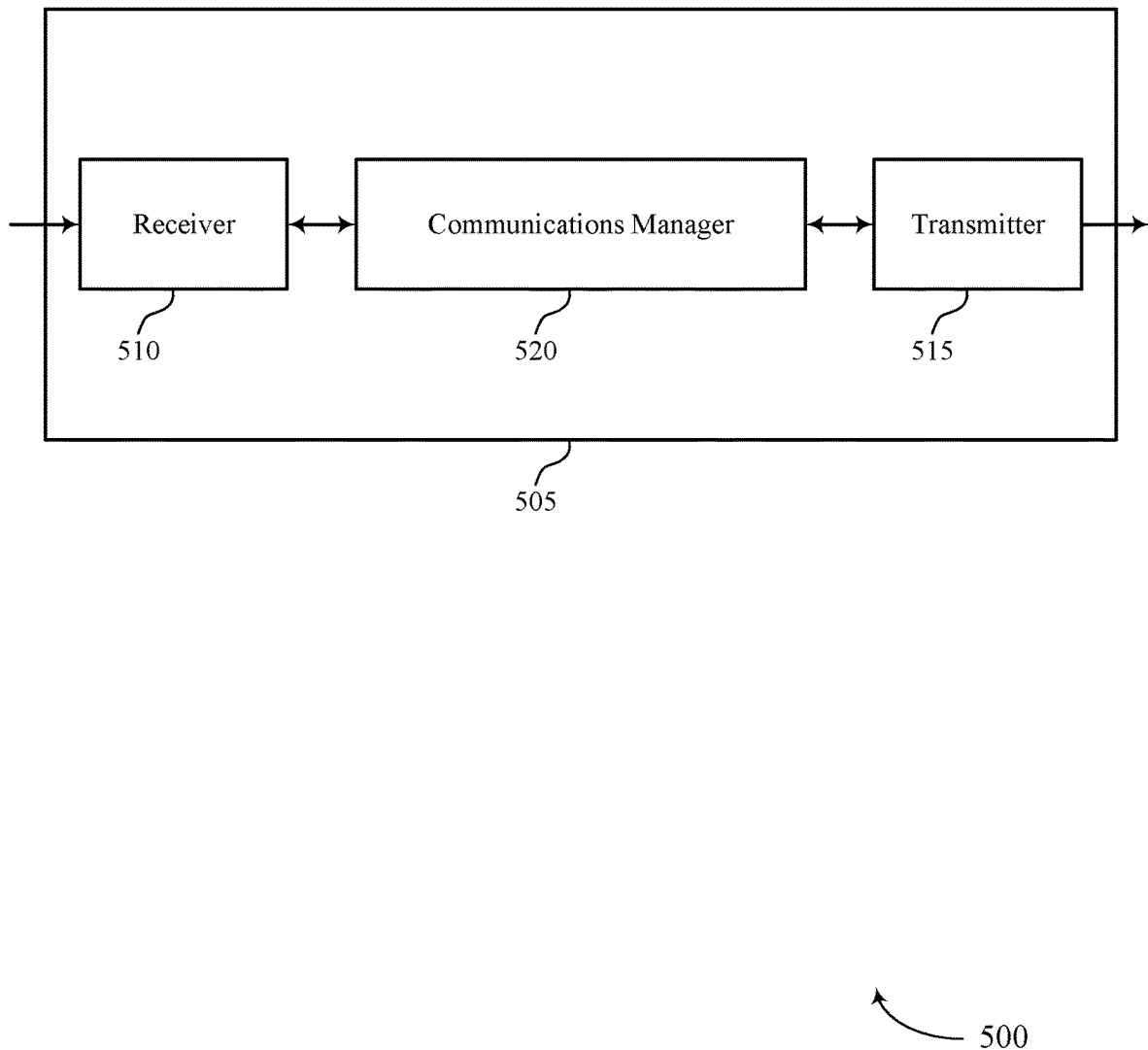
FIGS. 5 and 6 show block diagrams of devices that support flexible signaling for acknowledgment feedback delay and downlink scheduling delay in accordance with aspects of the present disclosure.

FIG. 5 shows a block diagram 500 of a device 505 that supports flexible signaling for acknowledgment feedback delay and downlink scheduling delay in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to flexible signaling for acknowledgment feedback delay and downlink scheduling delay). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to flexible signaling for acknowledgment feedback delay and downlink scheduling delay). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of flexible signaling for acknowledgment feedback delay and downlink scheduling delay as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally, or alternatively, in some examples, the communications manager 520, the receiver 510, the transmitter 515, or various combinations or components thereof may be implemented in hardware, software (e.g., executed by a processor), or any combination thereof. If implemented in code executed by a processor, the functions of the communications manager 520, the receiver 510, the transmitter 515, or various combinations or components thereof may be performed by a general-purpose processor, a DSP, a central processing unit (CPU), a graphics processing unit (GPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, a control message including an indication of a length of a number of bits for a DCI field, the DCI field including a jointly encoded indication for a downlink shared channel scheduling delay and an acknowledgment feedback delay. The communications manager 520 may be configured as or otherwise support a means for receiving, from the base station based on the control message, DCI including the DCI field. The communications manager 520 may be configured as or otherwise support a means for receiving, from the base station, a downlink shared channel based on the downlink shared channel scheduling delay. The communications manager 520 may be configured as or otherwise support a means for transmitting, to the base station, acknowledgment feedback based on the acknowledgment feedback delay.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources. For example, by jointly indicating a downlink shared channel scheduling delay and an acknowledgment feedback delay in a single jointly encoded indication of a DCI field, the device 505 may determine each delay from a same indication rather than receiving individual delay indications for each message, thereby using the communication resources more efficiently.

Figure 6:
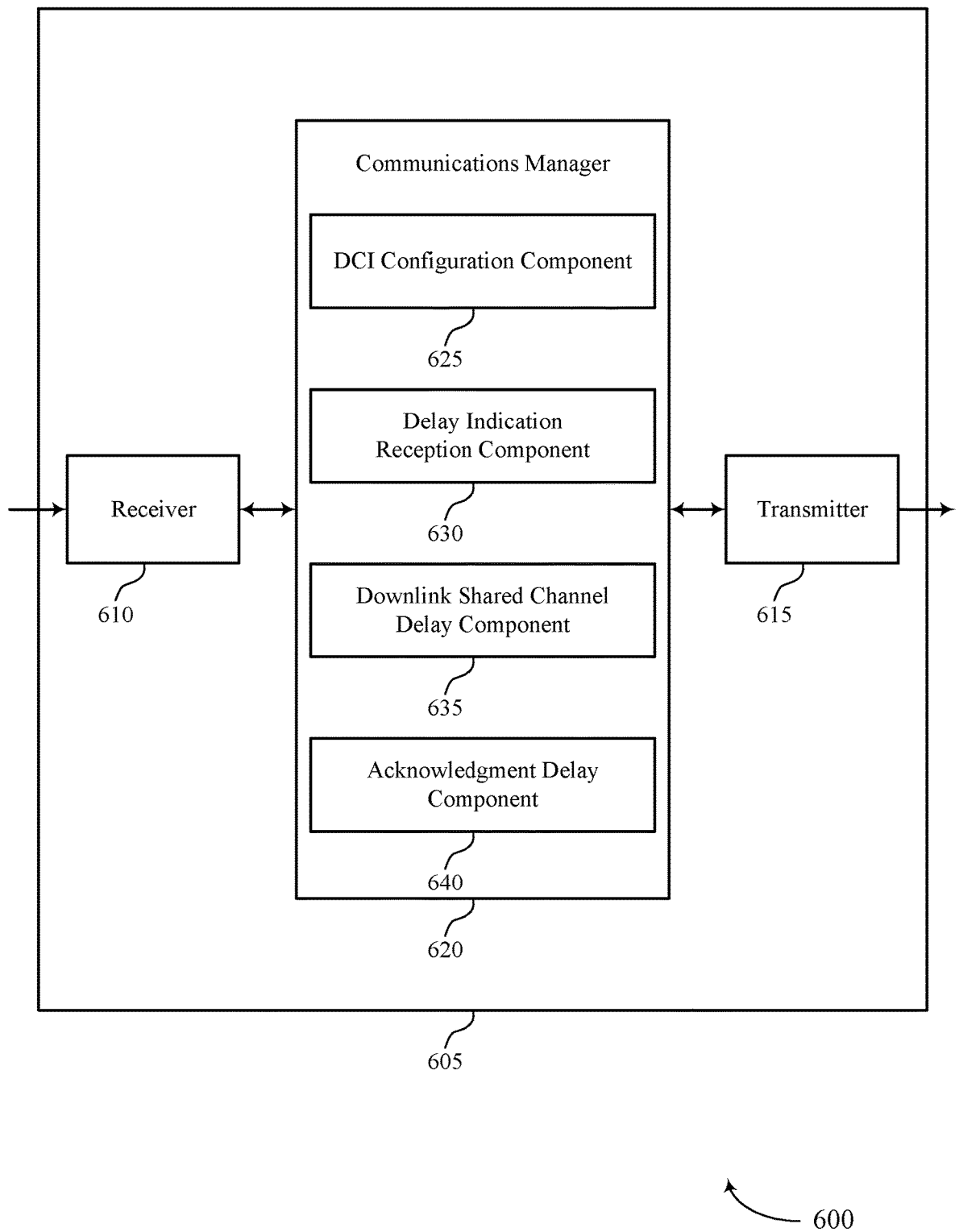

FIG. 6 shows a block diagram 600 of a device 605 that supports flexible signaling for acknowledgment feedback delay and downlink scheduling delay in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to flexible signaling for acknowledgment feedback delay and downlink scheduling delay). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to flexible signaling for acknowledgment feedback delay and downlink scheduling delay). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of flexible signaling for acknowledgment feedback delay and downlink scheduling delay as described herein. For example, the communications manager 620 may include a DCI configuration component 625, a delay indication reception component 630, a downlink shared channel delay component 635, an acknowledgment delay component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The DCI configuration component 625 may be configured as or otherwise support a means for receiving, from a base station, a control message including an indication of a length of a number of bits for a DCI field, the DCI field including a jointly encoded indication for a downlink shared channel scheduling delay and an acknowledgment feedback delay. The delay indication reception component 630 may be configured as or otherwise support a means for receiving, from the base station based on the control message, DCI including the DCI field. The downlink shared channel delay component 635 may be configured as or otherwise support a means for receiving, from the base station, a downlink shared channel based on the downlink shared channel scheduling delay. The acknowledgment delay component 640 may be configured as or otherwise support a means for transmitting, to the base station, acknowledgment feedback based on the acknowledgment feedback delay.

Figure 7:
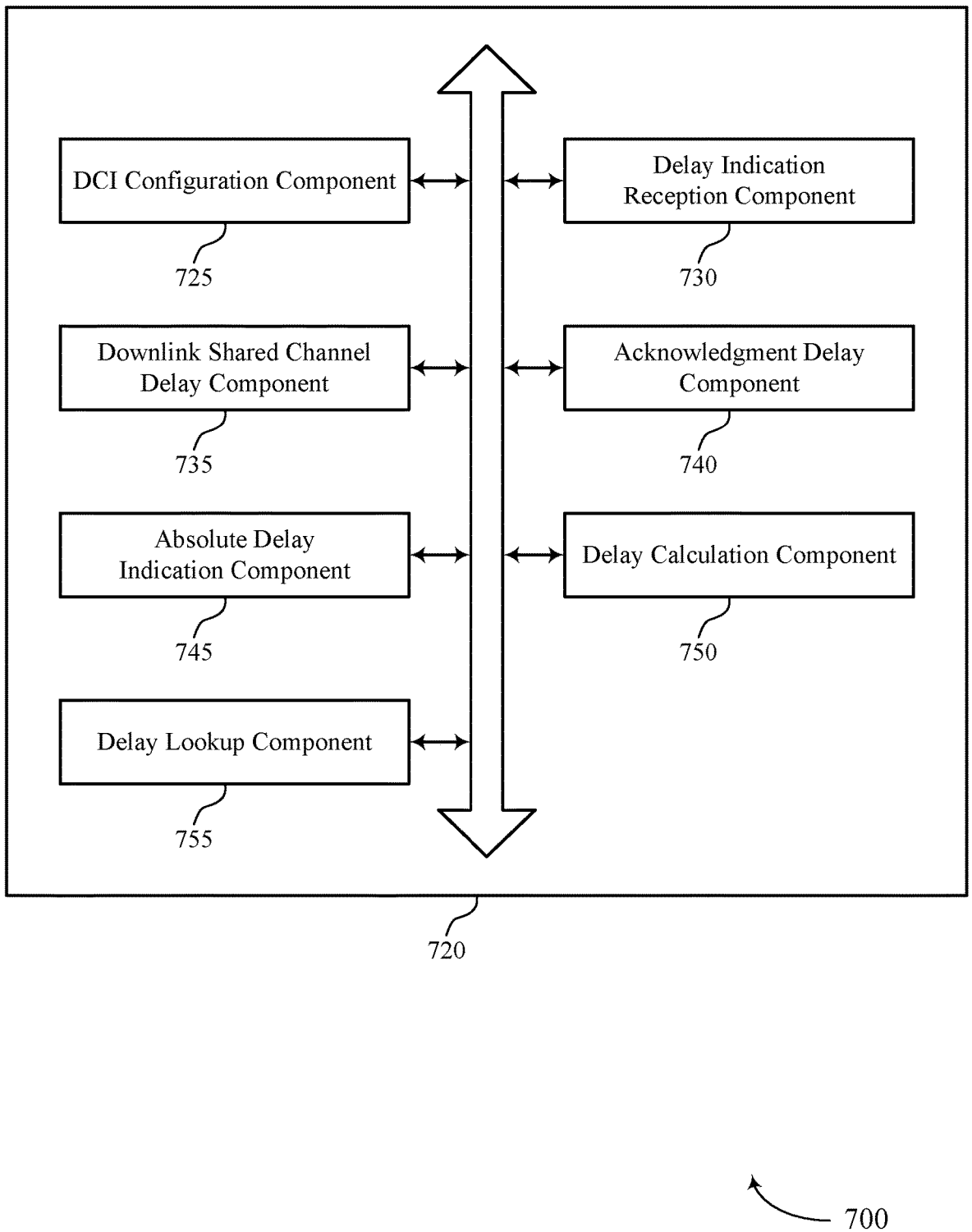
FIG. 7 shows a block diagram of a communications manager that supports flexible signaling for acknowledgment feedback delay and downlink scheduling delay in accordance with aspects of the present disclosure.

FIG. 7 shows a block diagram 700 of a communications manager 720 that supports flexible signaling for acknowledgment feedback delay and downlink scheduling delay in accordance with aspects of the present disclosure. The communications manager 720 may be an example of aspects of a communications manager 520, a communications manager 620, or both, as described herein. The communications manager 720, or various components thereof, may be an example of means for performing various aspects of flexible signaling for acknowledgment feedback delay and downlink scheduling delay as described herein. For example, the communications manager 720 may include a DCI configuration component 725, a delay indication reception component 730, a downlink shared channel delay component 735, an acknowledgment delay component 740, an absolute delay indication component 745, a delay calculation component 750, a delay lookup component 755, or any combination thereof. Each of these components may communicate, directly or indirectly, with one another (e.g., via one or more buses).

The communications manager 720 may support wireless communications at a UE in accordance with examples as disclosed herein. The DCI configuration component 725 may be configured as or otherwise support a means for receiving, from a base station, a control message including an indication of a length of a number of bits for a DCI field, the DCI field including a jointly encoded indication for a downlink shared channel scheduling delay and an acknowledgment feedback delay. The delay indication reception component 730 may be configured as or otherwise support a means for receiving, from the base station based on the control message, DCI including the DCI field. The downlink shared channel delay component 735 may be configured as or otherwise support a means for receiving, from the base station, a downlink shared channel based on the downlink shared channel scheduling delay. The acknowledgment delay component 740 may be configured as or otherwise support a means for transmitting, to the base station, acknowledgment feedback based on the acknowledgment feedback delay.

In some examples, to support receiving the DCI including the DCI field, the delay indication reception component 730 may be configured as or otherwise support a means for receiving the DCI field including a single value, where the single value is based on a first index for the downlink shared channel scheduling delay and a second index for the acknowledgment feedback delay. In some examples, to support receiving the DCI including the DCI field, the delay indication reception component 730 may be configured as or otherwise support a means for determining the downlink shared channel scheduling delay and the acknowledgment feedback delay based on the single value.

In some examples, to support determining the downlink shared channel scheduling delay and the acknowledgment feedback delay, the delay calculation component 750 may be configured as or otherwise support a means for performing a first calculation using the single value to determine the downlink shared channel scheduling delay. In some examples, to support determining the downlink shared channel scheduling delay and the acknowledgment feedback delay, the delay calculation component 750 may be configured as or otherwise support a means for performing a second calculation using the single value to determine the acknowledgment feedback delay.

In some examples, to support determining the downlink shared channel scheduling delay and the acknowledgment feedback delay, the delay lookup component 755 may be configured as or otherwise support a means for determining the downlink shared channel scheduling delay and the acknowledgment feedback delay based on a table including a first set of multiple downlink shared channel scheduling delay values and a second set of multiple acknowledgment feedback delay values, where the single value indicates a row of the table corresponding to the downlink shared channel scheduling delay and the acknowledgment feedback delay.

In some examples, to support receiving the DCI including the DCI field, the absolute delay indication component 745 may be configured as or otherwise support a means for receiving the DCI field including a first value corresponding to the downlink shared channel scheduling delay, a second value, and a third value, where the acknowledgment feedback delay is determined based on the second value and the third value. In some examples, the DCI field including the first value, the second value, and the third value may be received based on the downlink shared channel scheduling delay and the acknowledgment feedback delay including a number of BL/CE TTIs.

In some examples, to support receiving the control message, the DCI configuration component 725 may be configured as or otherwise support a means for receiving the control message including the indication of the length of the number of bits for the DCI field via RRC signaling. In some examples, the number of bits may be based on the downlink shared channel scheduling delay and the acknowledgment feedback delay including a number of absolute TTIs or including a number of BL/CE TTIs. In some examples, the number of bits includes five bits, six bits, or seven bits.

In some examples, the downlink shared channel scheduling delay and the acknowledgment feedback delay include a number of absolute TTIs, a number of BL/CE TTIs, or a combination thereof. In some examples, the UE may be an MTC device.

Figure 8:
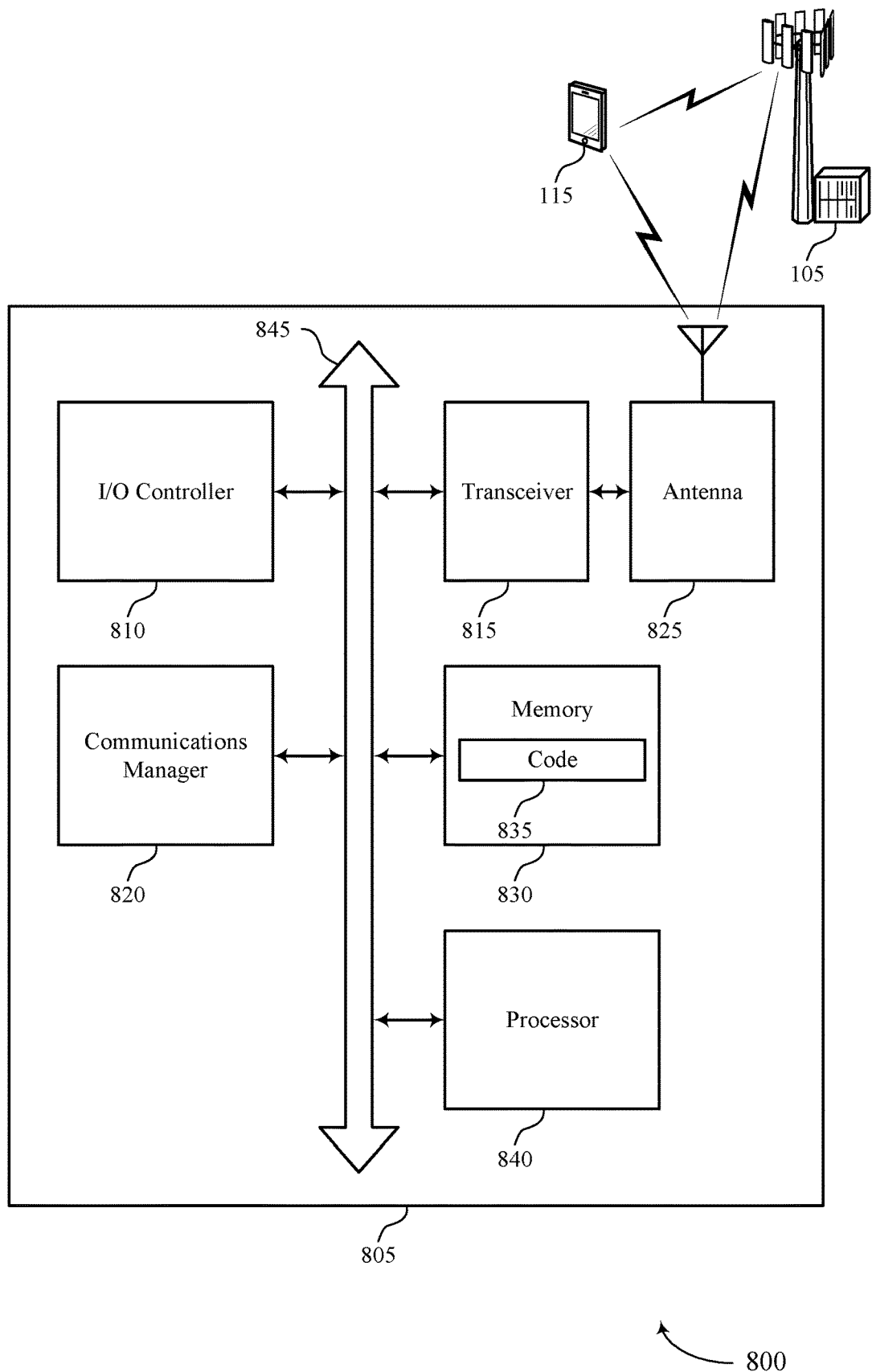
FIG. 8 shows a diagram of a system including a device that supports flexible signaling for acknowledgment feedback delay and downlink scheduling delay in accordance with aspects of the present disclosure.

FIG. 8 shows a diagram of a system 800 including a device 805 that supports flexible signaling for acknowledgment feedback delay and downlink scheduling delay in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, or electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting flexible signaling for acknowledgment feedback delay and downlink scheduling delay). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, a control message including an indication of a length of a number of bits for a DCI field, the DCI field including a jointly encoded indication for a downlink shared channel scheduling delay and an acknowledgment feedback delay. The communications manager 820 may be configured as or otherwise support a means for receiving, from the base station based on the control message, DCI including the DCI field. The communications manager 820 may be configured as or otherwise support a means for receiving, from the base station, a downlink shared channel based on the downlink shared channel scheduling delay. The communications manager 820 may be configured as or otherwise support a means for transmitting, to the base station, acknowledgment feedback based on the acknowledgment feedback delay.

By including or configuring the communications manager 820 in accordance with examples as described herein, the device 805 may support techniques for more efficient utilization of communication resources. For example, by jointly indicating a downlink shared channel scheduling delay and an acknowledgment feedback delay in a single jointly encoded indication of a DCI field, the device 805 may determine each delay from a same indication rather than receiving individual delay indications for each message, thereby using the communication resources more efficiently In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of flexible signaling for acknowledgment feedback delay and downlink scheduling delay as described herein, or the processor 840 and the memory 830 may be otherwise configured to perform or support such operations.

Figure 9:
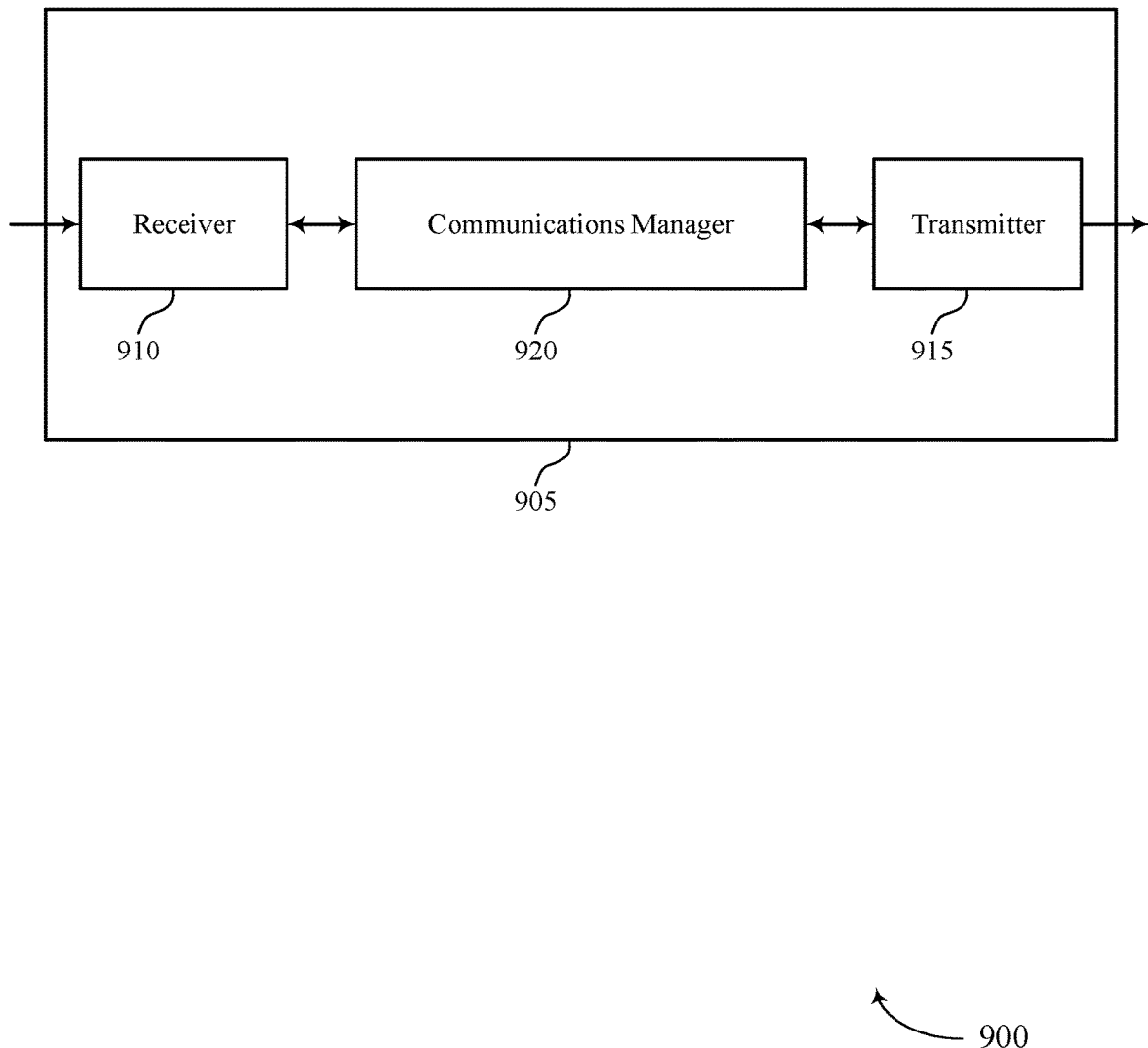
FIGS. 9 and 10 show block diagrams of devices that support flexible signaling for acknowledgment feedback delay and downlink scheduling delay in accordance with aspects of the present disclosure.

FIG. 9 shows a block diagram 900 of a device 905 that supports flexible signaling for acknowledgment feedback delay and downlink scheduling delay in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to flexible signaling for acknowledgment feedback delay and downlink scheduling delay). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to flexible signaling for acknowledgment feedback delay and downlink scheduling delay). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of flexible signaling for acknowledgment feedback delay and downlink scheduling delay as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally, or alternatively, in some examples, the communications manager 920, the receiver 910, the transmitter 915, or various combinations or components thereof may be implemented in hardware, software (e.g., executed by a processor, or any combination thereof. If implemented in code executed by a processor, the functions of the communications manager 920, the receiver 910, the transmitter 915, or various combinations or components thereof may be performed by a general-purpose processor, a DSP, a CPU, a GPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to a UE, a control message including an indication of a length of a number of bits for a DCI field, the DCI field including a jointly encoded indication for a downlink shared channel scheduling delay and an acknowledgment feedback delay. The communications manager 920 may be configured as or otherwise support a means for transmitting, to the UE based on the control message, DCI including the DCI field. The communications manager 920 may be configured as or otherwise support a means for transmitting, to the UE, a downlink shared channel based on the downlink shared channel scheduling delay. The communications manager 920 may be configured as or otherwise support a means for receiving, from the UE, acknowledgment feedback based on the acknowledgment feedback delay.

Figure 10:
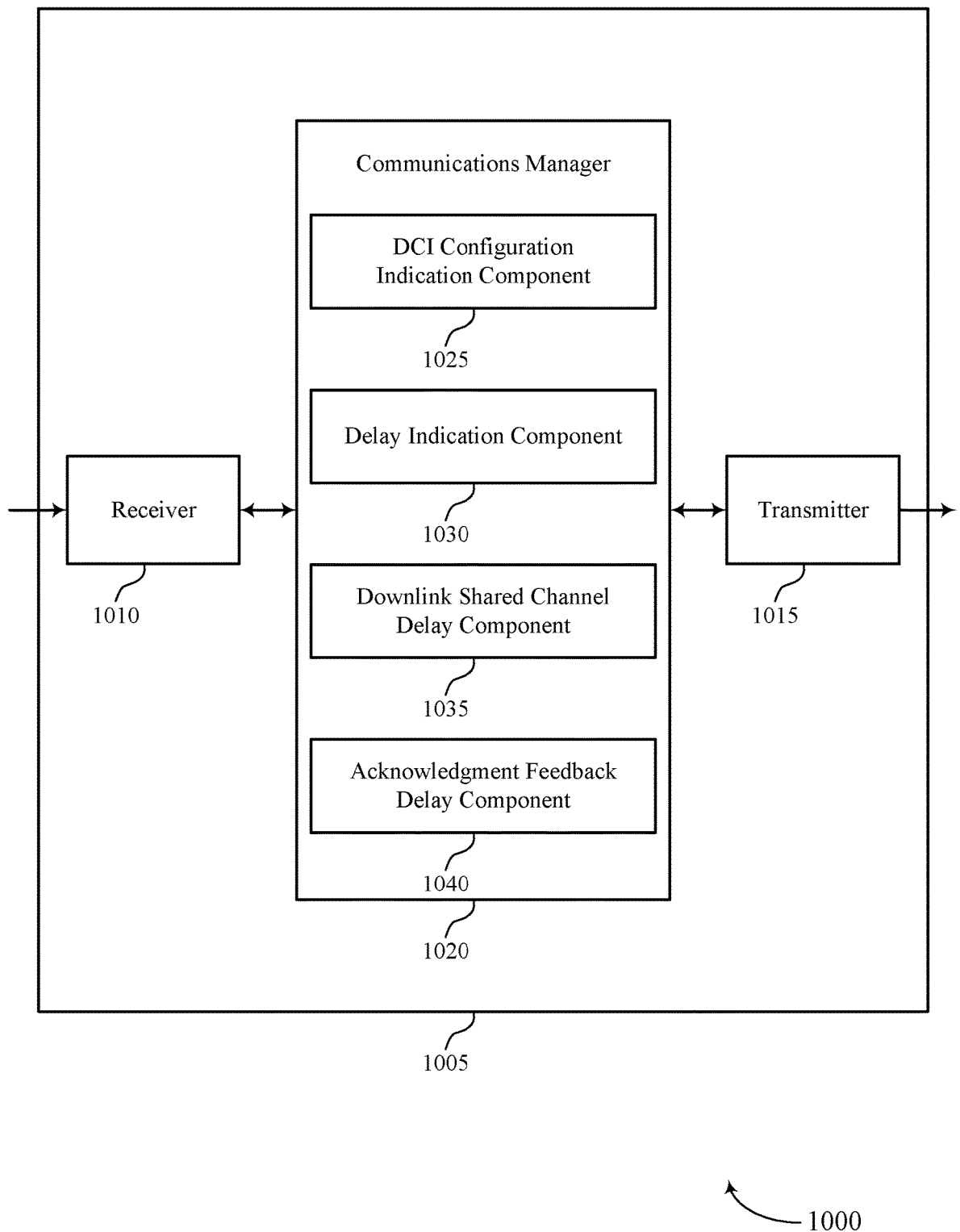

FIG. 10 shows a block diagram 1000 of a device 1005 that supports flexible signaling for acknowledgment feedback delay and downlink scheduling delay in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to flexible signaling for acknowledgment feedback delay and downlink scheduling delay). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to flexible signaling for acknowledgment feedback delay and downlink scheduling delay). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of flexible signaling for acknowledgment feedback delay and downlink scheduling delay as described herein. For example, the communications manager 1020 may include a DCI configuration indication component 1025, a delay indication component 1030, a downlink shared channel delay component 1035, an acknowledgment feedback delay component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The DCI configuration indication component 1025 may be configured as or otherwise support a means for transmitting, to a UE, a control message including an indication of a length of a number of bits for a DCI field, the DCI field including a jointly encoded indication for a downlink shared channel scheduling delay and an acknowledgment feedback delay. The delay indication component 1030 may be configured as or otherwise support a means for transmitting, to the UE based on the control message, DCI including the DCI field. The downlink shared channel delay component 1035 may be configured as or otherwise support a means for transmitting, to the UE, a downlink shared channel based on the downlink shared channel scheduling delay. The acknowledgment feedback delay component 1040 may be configured as or otherwise support a means for receiving, from the UE, acknowledgment feedback based on the acknowledgment feedback delay.

Figure 11:
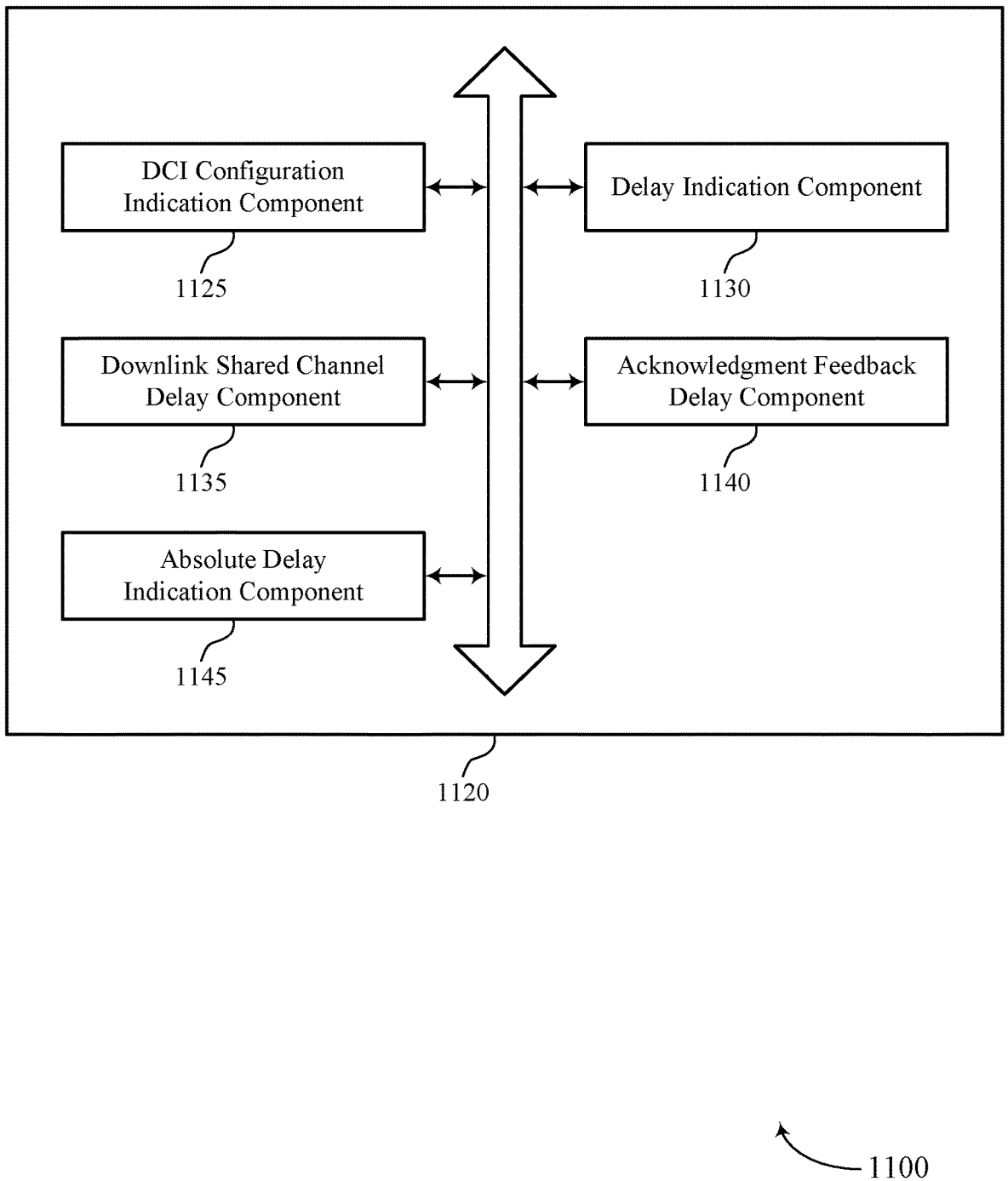
FIG. 11 shows a block diagram of a communications manager that supports flexible signaling for acknowledgment feedback delay and downlink scheduling delay in accordance with aspects of the present disclosure.

FIG. 11 shows a block diagram 1100 of a communications manager 1120 that supports flexible signaling for acknowledgment feedback delay and downlink scheduling delay in accordance with aspects of the present disclosure. The communications manager 1120 may be an example of aspects of a communications manager 920, a communications manager 1020, or both, as described herein. The communications manager 1120, or various components thereof, may be an example of means for performing various aspects of flexible signaling for acknowledgment feedback delay and downlink scheduling delay as described herein. For example, the communications manager 1120 may include a DCI configuration indication component 1125, a delay indication component 1130, a downlink shared channel delay component 1135, an acknowledgment feedback delay component 1140, an absolute delay indication component 1145, or any combination thereof. Each of these components may communicate, directly or indirectly, with one another (e.g., via one or more buses).

The communications manager 1120 may support wireless communications at a base station in accordance with examples as disclosed herein. The DCI configuration indication component 1125 may be configured as or otherwise support a means for transmitting, to a UE, a control message including an indication of a length of a number of bits for a DCI field, the DCI field including a jointly encoded indication for a downlink shared channel scheduling delay and an acknowledgment feedback delay. The delay indication component 1130 may be configured as or otherwise support a means for transmitting, to the UE based on the control message, DCI including the DCI field. The downlink shared channel delay component 1135 may be configured as or otherwise support a means for transmitting, to the UE, a downlink shared channel based on the downlink shared channel scheduling delay. The acknowledgment feedback delay component 1140 may be configured as or otherwise support a means for receiving, from the UE, acknowledgment feedback based on the acknowledgment feedback delay.

In some examples, to support transmitting the DCI including the DCI field, the delay indication component 1130 may be configured as or otherwise support a means for transmitting the DCI field including a single value, the single value calculated based on a first index for the downlink shared channel scheduling delay and a second index for the acknowledgment feedback delay, where the downlink shared channel scheduling delay and the acknowledgment feedback delay are indicated based on the single value. In some examples, the downlink shared channel scheduling delay and the acknowledgment feedback delay may be indicated based on a table including a first set of multiple downlink shared channel scheduling delay values and a second set of multiple acknowledgment feedback delay values, the single value indicating a row of the table corresponding to the downlink shared channel scheduling delay and the acknowledgment feedback delay.

In some examples, to support transmitting the DCI including the DCI field, the absolute delay indication component 1145 may be configured as or otherwise support a means for transmitting the DCI field including a first value corresponding to the downlink shared channel scheduling delay, a second value, and a third value, where the acknowledgment feedback delay is indicated based on the second value and the third value. In some examples, the DCI field including the first value, the second value, and the third value may be transmitted based on the downlink shared channel scheduling delay and the acknowledgment feedback delay including a number of BL/CE TTIs.

In some examples, to support transmitting the control message, the DCI configuration indication component 1125 may be configured as or otherwise support a means for transmitting the control message including the indication of the length of the number of bits for the DCI field via RRC signaling. In some examples, the number of bits may be based on the downlink shared channel scheduling delay and the acknowledgment feedback delay including a number of absolute TTIs or including a number of BL/CE TTIs. In some examples, the number of bits may include five bits, six bits, or seven bits.

In some examples, the downlink shared channel scheduling delay and the acknowledgment feedback delay may include a number of absolute TTIs, a number of BL/CE TTIs, or a combination thereof. In some examples, the UE may be an MTC device.

Figure 12:
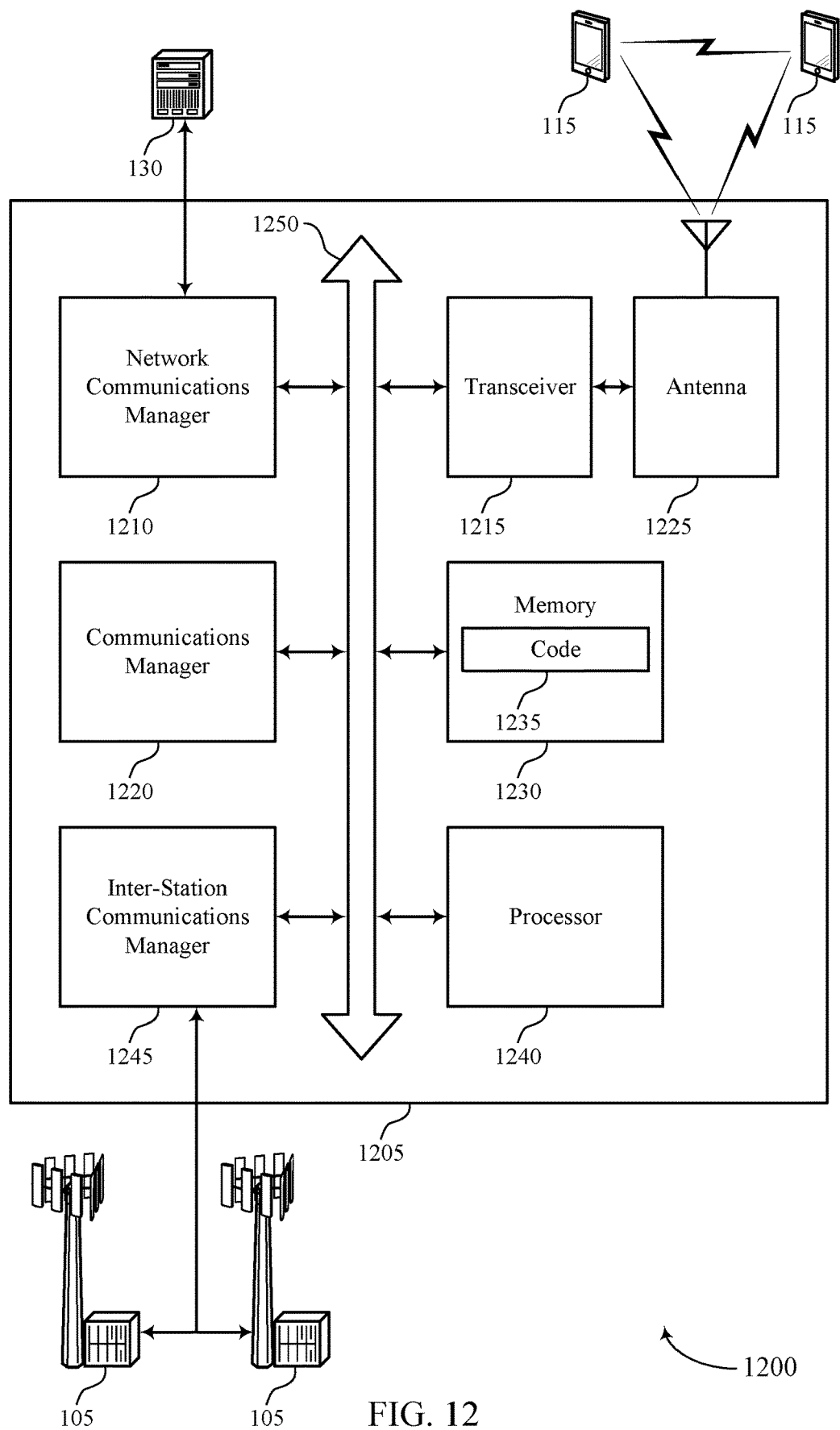
FIG. 12 shows a diagram of a system including a device that supports flexible signaling for acknowledgment feedback delay and downlink scheduling delay in accordance with aspects of the present disclosure.

FIG. 12 shows a diagram of a system 1200 including a device 1205 that supports flexible signaling for acknowledgment feedback delay and downlink scheduling delay in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, or electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting flexible signaling for acknowledgment feedback delay and downlink scheduling delay). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a UE, a control message including an indication of a length of a number of bits for a DCI field, the DCI field including a jointly encoded indication for a downlink shared channel scheduling delay and an acknowledgment feedback delay. The communications manager 1220 may be configured as or otherwise support a means for transmitting, to the UE based on the control message, DCI including the DCI field. The communications manager 1220 may be configured as or otherwise support a means for transmitting, to the UE, a downlink shared channel based on the downlink shared channel scheduling delay. The communications manager 1220 may be configured as or otherwise support a means for receiving, from the UE, acknowledgment feedback based on the acknowledgment feedback delay.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of flexible signaling for acknowledgment feedback delay and downlink scheduling delay as described herein, or the processor 1240 and the memory 1230 may be otherwise configured to perform or support such operations.

Figure 13:
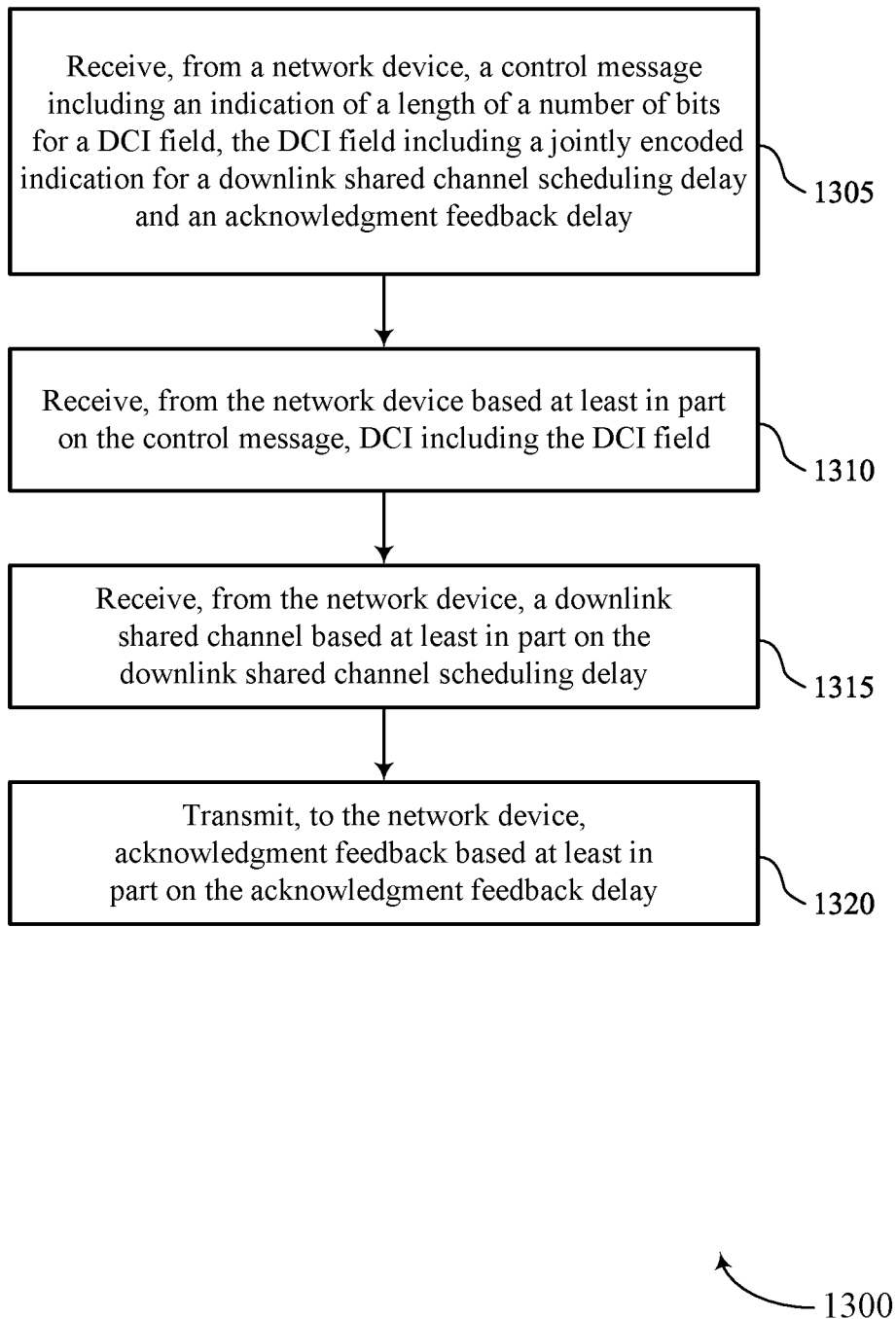
FIGS. 13 through 17 show flowcharts illustrating methods that support flexible signaling for acknowledgment feedback delay and downlink scheduling delay in accordance with aspects of the present disclosure.

FIG. 13 shows a flowchart illustrating a method 1300 that supports flexible signaling for acknowledgment feedback delay and downlink scheduling delay in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network device, a control message including an indication of a length of a number of bits for a DCI field, the DCI field including a jointly encoded indication for a downlink shared channel scheduling delay and an acknowledgment feedback delay. The operations of 1305 may be performed in accordance with examples as disclosed herein. In some examples, aspects of the operations of 1305 may be performed by a DCI configuration component 725 as described with reference to FIG. 7.

At 1310, the method may include receiving, from the network device based at least in part on the control message, DCI including the DCI field. The operations of 1310 may be performed in accordance with examples as disclosed herein. In some examples, aspects of the operations of 1310 may be performed by a delay indication reception component 730 as described with reference to FIG. 7.

At 1315, the method may include receiving, from the network device, a downlink shared channel based at least in part on the downlink shared channel scheduling delay. The operations of 1315 may be performed in accordance with examples as disclosed herein. In some examples, aspects of the operations of 1315 may be performed by a downlink shared channel delay component 735 as described with reference to FIG. 7.

At 1320, the method may include transmitting, to the network device, acknowledgment feedback based at least in part on the acknowledgment feedback delay. The operations of 1320 may be performed in accordance with examples as disclosed herein. In some examples, aspects of the operations of 1320 may be performed by an acknowledgment delay component 740 as described with reference to FIG. 7.

Figure 14:
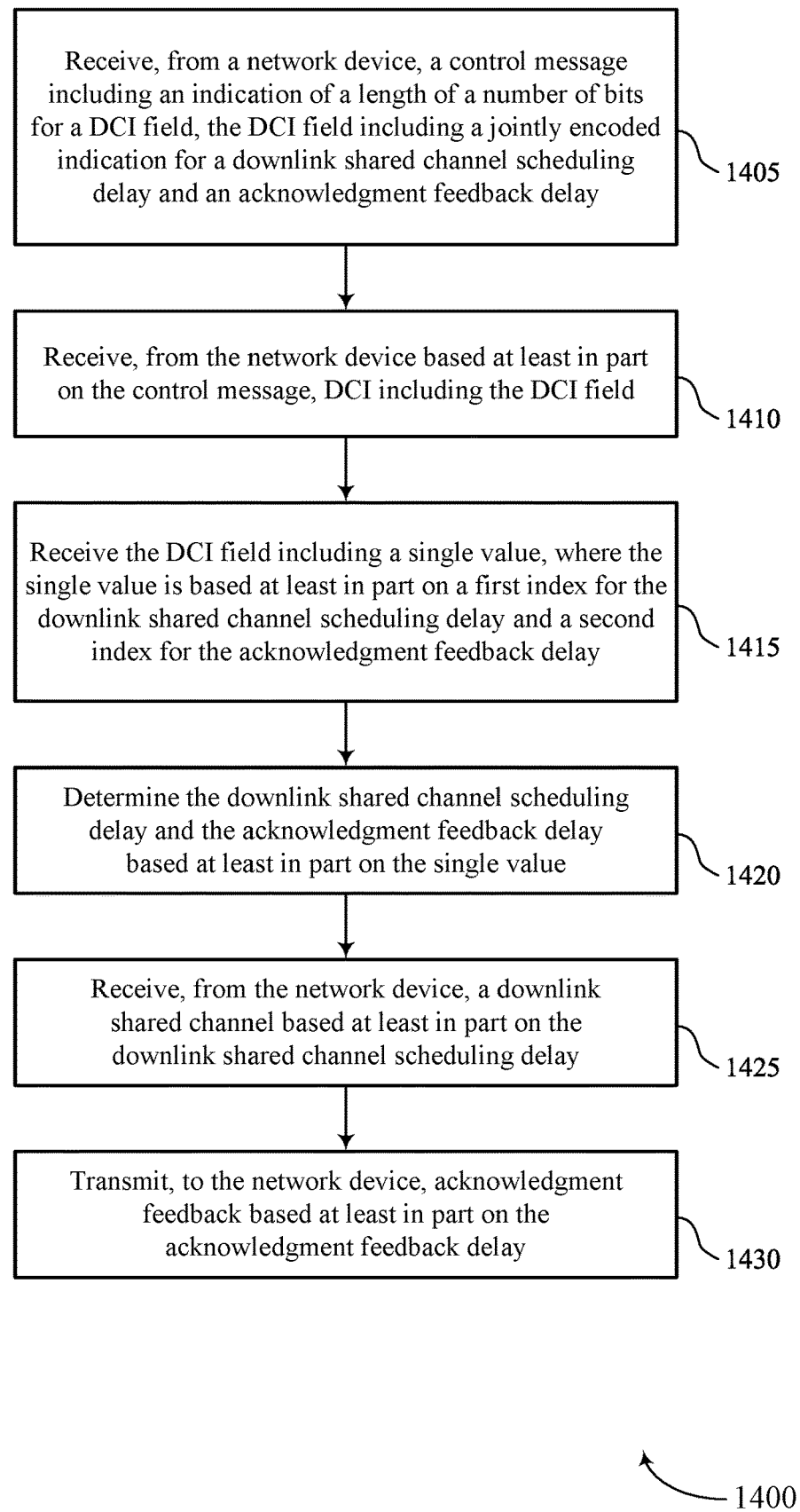

FIG. 14 shows a flowchart illustrating a method 1400 that supports flexible signaling for acknowledgment feedback delay and downlink scheduling delay in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving, from a network device, a control message including an indication of a length of a number of bits for a DCI field, the DCI field including a jointly encoded indication for a downlink shared channel scheduling delay and an acknowledgment feedback delay. The operations of 1405 may be performed in accordance with examples as disclosed herein. In some examples, aspects of the operations of 1405 may be performed by a DCI configuration component 725 as described with reference to FIG. 7.

At 1410, the method may include receiving, from the network device based at least in part on the control message, DCI including the DCI field. The operations of 1410 may be performed in accordance with examples as disclosed herein. In some examples, aspects of the operations of 1410 may be performed by a delay indication reception component 730 as described with reference to FIG. 7.

At 1415, the method may include receiving the DCI field including a single value, where the single value is based at least in part on a first index for the downlink shared channel scheduling delay and a second index for the acknowledgment feedback delay. The operations of 1415 may be performed in accordance with examples as disclosed herein. In some examples, aspects of the operations of 1415 may be performed by a delay indication reception component 730 as described with reference to FIG. 7.

At 1420, the method may include determining the downlink shared channel scheduling delay and the acknowledgment feedback delay based at least in part on the single value. The operations of 1420 may be performed in accordance with examples as disclosed herein. In some examples, aspects of the operations of 1420 may be performed by a delay indication reception component 730 as described with reference to FIG. 7.

At 1425, the method may include receiving, from the network device, a downlink shared channel based at least in part on the downlink shared channel scheduling delay. The operations of 1425 may be performed in accordance with examples as disclosed herein. In some examples, aspects of the operations of 1425 may be performed by a downlink shared channel delay component 735 as described with reference to FIG. 7.

At 1430, the method may include transmitting, to the network device, acknowledgment feedback based at least in part on the acknowledgment feedback delay. The operations of 1430 may be performed in accordance with examples as disclosed herein. In some examples, aspects of the operations of 1430 may be performed by an acknowledgment delay component 740 as described with reference to FIG. 7.

Figure 15:
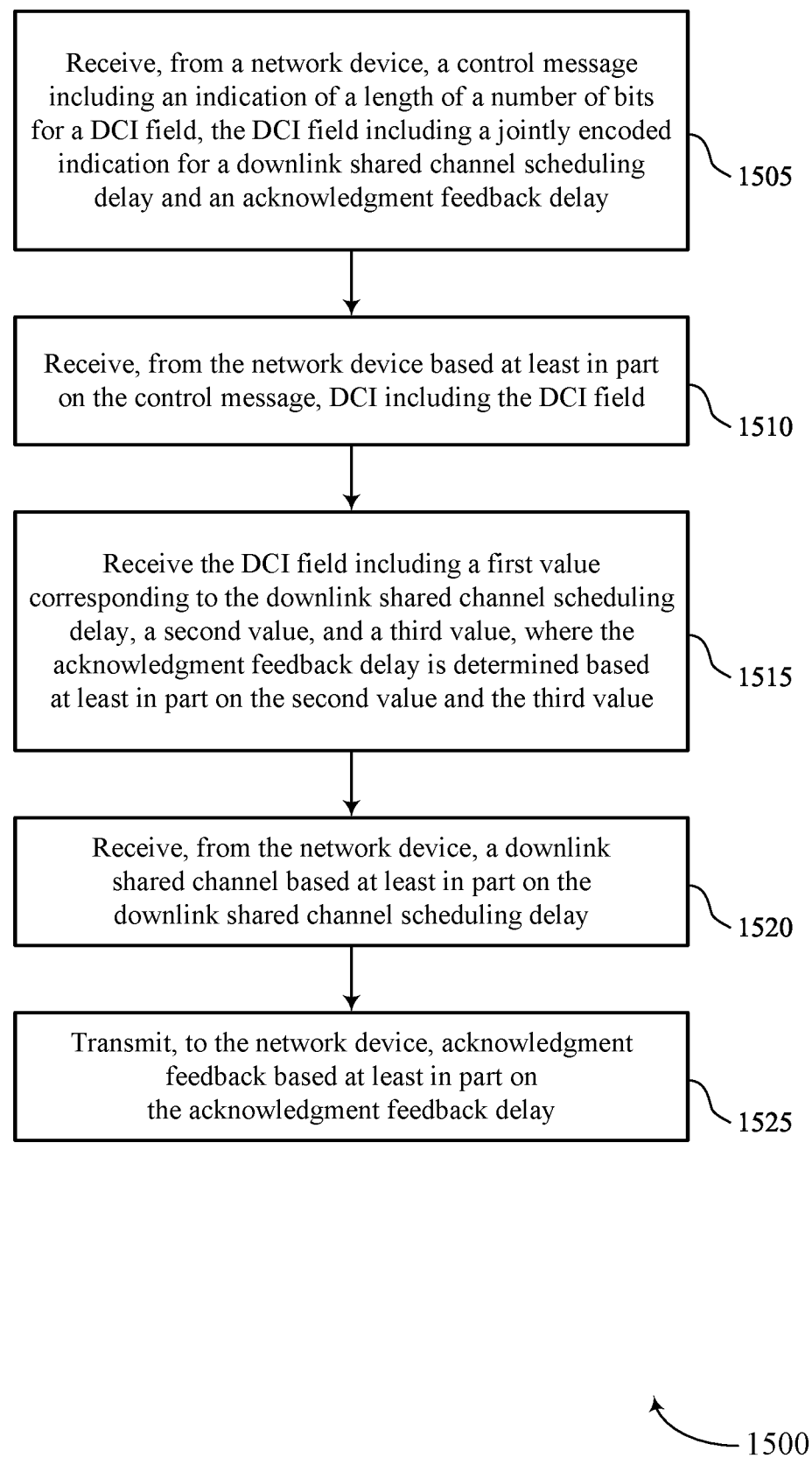

FIG. 15 shows a flowchart illustrating a method 1500 that supports flexible signaling for acknowledgment feedback delay and downlink scheduling delay in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving, from a network device, a control message including an indication of a length of a number of bits for a DCI field, the DCI field including a jointly encoded indication for a downlink shared channel scheduling delay and an acknowledgment feedback delay. The operations of 1505 may be performed in accordance with examples as disclosed herein. In some examples, aspects of the operations of 1505 may be performed by a DCI configuration component 725 as described with reference to FIG. 7.

At 1510, the method may include receiving, from the network device based at least in part on the control message, DCI including the DCI field. The operations of 1510 may be performed in accordance with examples as disclosed herein. In some examples, aspects of the operations of 1510 may be performed by a delay indication reception component 730 as described with reference to FIG. 7.

At 1515, the method may include receiving the DCI field including a first value corresponding to the downlink shared channel scheduling delay, a second value, and a third value, where the acknowledgment feedback delay is determined based at least in part on the second value and the third value. The operations of 1515 may be performed in accordance with examples as disclosed herein. In some examples, aspects of the operations of 1515 may be performed by an absolute delay indication component 745 as described with reference to FIG. 7.

At 1520, the method may include receiving, from the network device, a downlink shared channel based at least in part on the downlink shared channel scheduling delay. The operations of 1520 may be performed in accordance with examples as disclosed herein. In some examples, aspects of the operations of 1520 may be performed by a downlink shared channel delay component 735 as described with reference to FIG. 7.

At 1525, the method may include transmitting, to the network device, acknowledgment feedback based at least in part on the acknowledgment feedback delay. The operations of 1525 may be performed in accordance with examples as disclosed herein. In some examples, aspects of the operations of 1525 may be performed by an acknowledgment delay component 740 as described with reference to FIG. 7.

Figure 16:
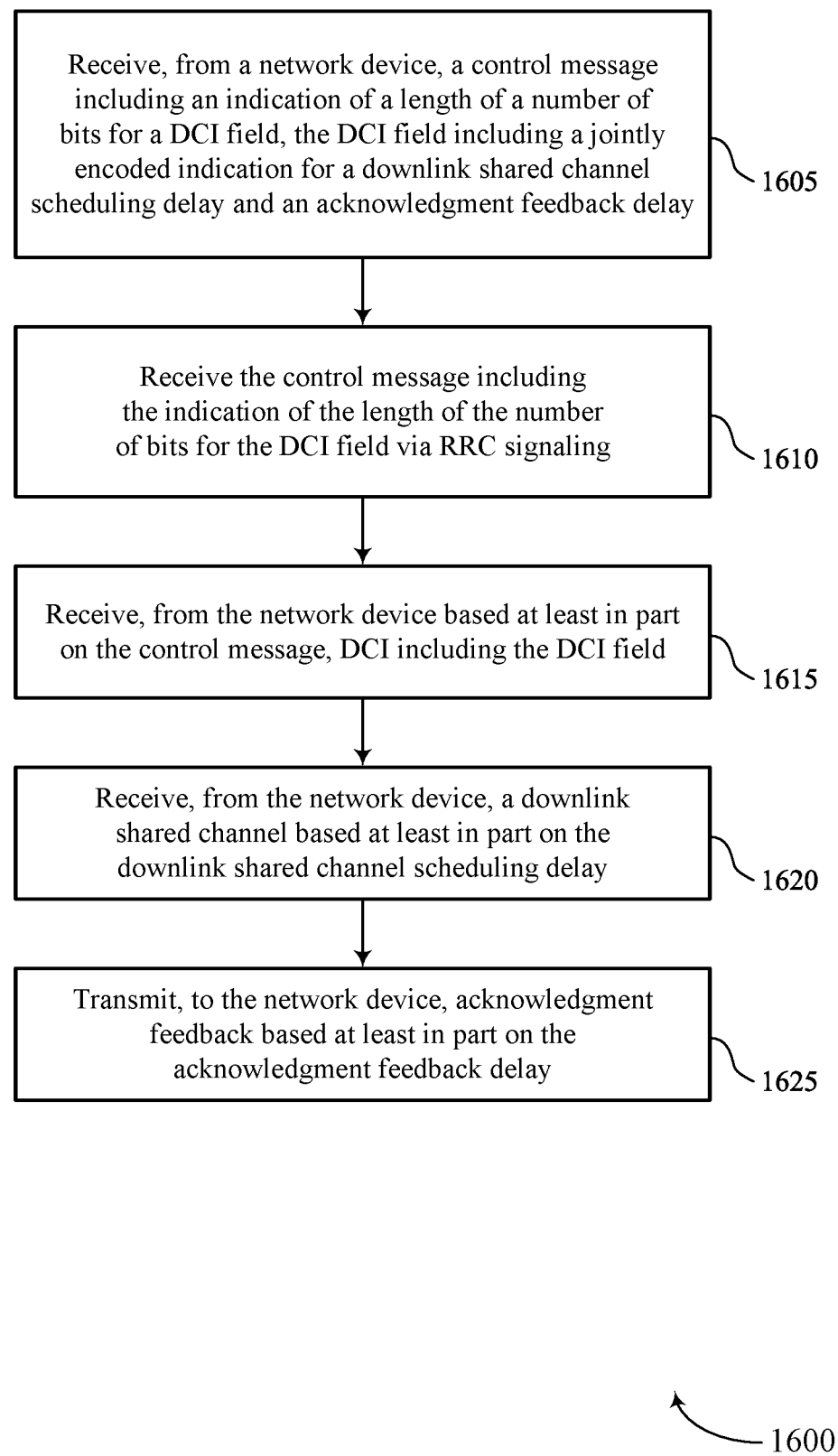

FIG. 16 shows a flowchart illustrating a method 1600 that supports flexible signaling for acknowledgment feedback delay and downlink scheduling delay in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include receiving, from a network device, a control message including an indication of a length of a number of bits for a DCI field, the DCI field including a jointly encoded indication for a downlink shared channel scheduling delay and an acknowledgment feedback delay. The operations of 1605 may be performed in accordance with examples as disclosed herein. In some examples, aspects of the operations of 1605 may be performed by a DCI configuration component 725 as described with reference to FIG. 7.

At 1610, the method may include receiving the control message including the indication of the length of the number of bits for the DCI field via RRC signaling. The operations of 1610 may be performed in accordance with examples as disclosed herein. In some examples, aspects of the operations of 1610 may be performed by a DCI configuration component 725 as described with reference to FIG. 7.

At 1615, the method may include receiving, from the network device based at least in part on the control message, DCI including the DCI field. The operations of 1615 may be performed in accordance with examples as disclosed herein. In some examples, aspects of the operations of 1615 may be performed by a delay indication reception component 730 as described with reference to FIG. 7.

At 1620, the method may include receiving, from the network device, a downlink shared channel based at least in part on the downlink shared channel scheduling delay. The operations of 1620 may be performed in accordance with examples as disclosed herein. In some examples, aspects of the operations of 1620 may be performed by a downlink shared channel delay component 735 as described with reference to FIG. 7.

At 1625, the method may include transmitting, to the network device, acknowledgment feedback based at least in part on the acknowledgment feedback delay. The operations of 1625 may be performed in accordance with examples as disclosed herein. In some examples, aspects of the operations of 1625 may be performed by an acknowledgment delay component 740 as described with reference to FIG. 7.

Figure 17:
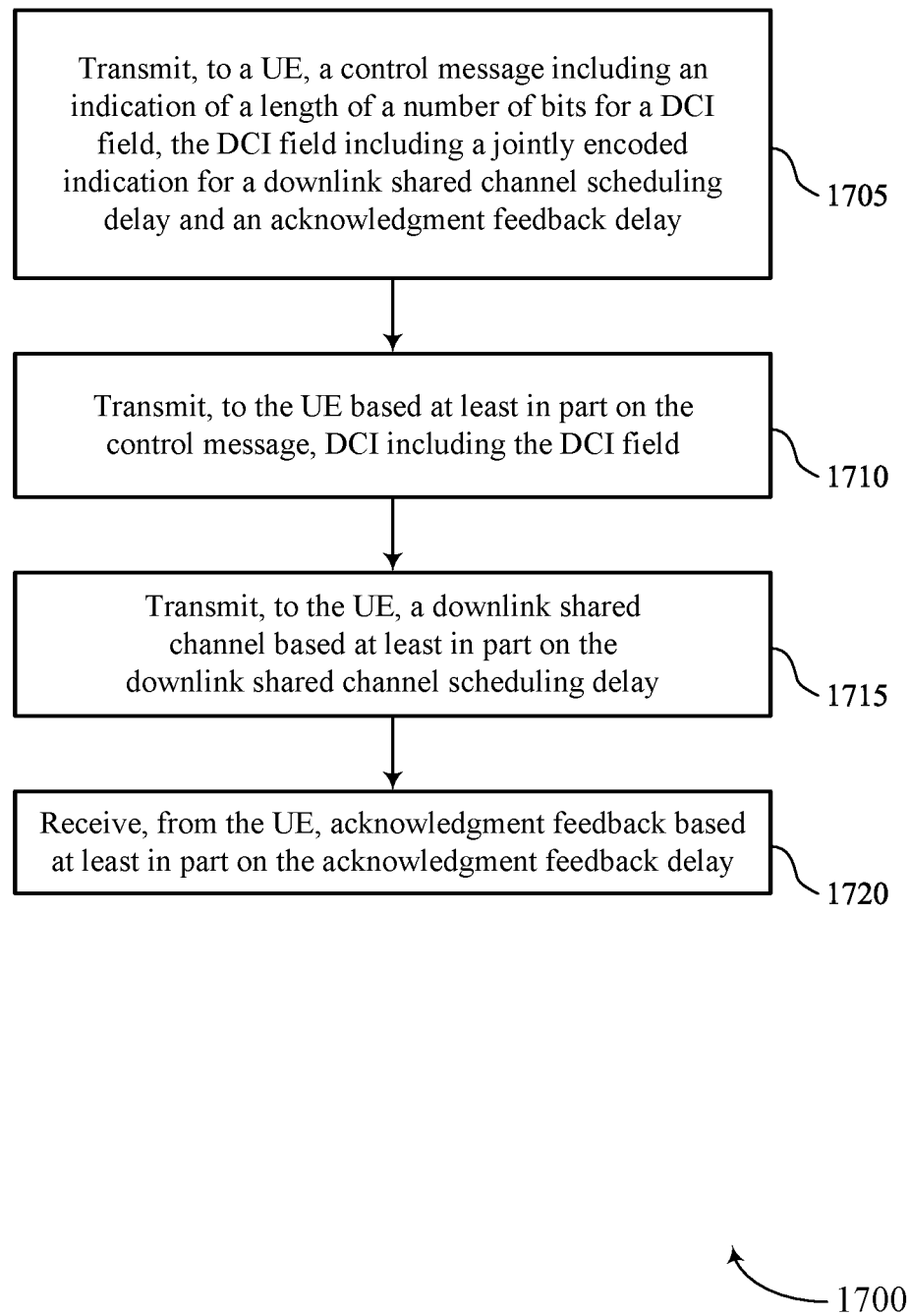

FIG. 17 shows a flowchart illustrating a method 1700 that supports flexible signaling for acknowledgment feedback delay and downlink scheduling delay in accordance with aspects of the present disclosure. The operations of the method 1700 may be implemented by a network device or its components as described herein. For example, the operations of the method 1700 may be performed by a network device 105 as described with reference to FIGS. 1 through 4 and 9 through 12. In some examples, a network device may execute a set of instructions to control the functional elements of the network device to perform the described functions. Additionally, or alternatively, the network device may perform aspects of the described functions using special-purpose hardware.

At 1705, the method may include transmitting, to a UE, a control message including an indication of a length of a number of bits for a DCI field, the DCI field including a jointly encoded indication for a downlink shared channel scheduling delay and an acknowledgment feedback delay. The operations of 1705 may be performed in accordance with examples as disclosed herein. In some examples, aspects of the operations of 1705 may be performed by a DCI configuration indication component 1125 as described with reference to FIG. 11.

At 1710, the method may include transmitting, to the UE based at least in part on the control message, DCI including the DCI field. The operations of 1710 may be performed in accordance with examples as disclosed herein. In some examples, aspects of the operations of 1710 may be performed by a delay indication component 1130 as described with reference to FIG. 11.

At 1715, the method may include transmitting, to the UE, a downlink shared channel based at least in part on the downlink shared channel scheduling delay. The operations of 1715 may be performed in accordance with examples as disclosed herein. In some examples, aspects of the operations of 1715 may be performed by a downlink shared channel delay component 1135 as described with reference to FIG. 11.

At 1720, the method may include receiving, from the UE, acknowledgment feedback based at least in part on the acknowledgment feedback delay. The operations of 1720 may be performed in accordance with examples as disclosed herein. In some examples, aspects of the operations of 1720 may be performed by an acknowledgment feedback delay component 1140 as described with reference to FIG. 11.

The following provides an overview of aspects of the present disclosure:

Aspect 1: A method for wireless communications at a UE, comprising: receiving, from a network device, a control message comprising an indication of a length of a number of bits for a downlink control information field, the downlink control information field comprising a jointly encoded indication for a downlink shared channel scheduling delay and an acknowledgment feedback delay; receiving, from the network device based at least in part on the control message, downlink control information comprising the downlink control information field; receiving, from the network device, a downlink shared channel based at least in part on the downlink shared channel scheduling delay; and transmitting, to the network device, acknowledgment feedback based at least in part on the acknowledgment feedback delay.

Aspect 2: The method of aspect 1, wherein receiving the downlink control information comprising the downlink control information field comprises: receiving the downlink control information field comprising a single value, wherein the single value is based at least in part on a first index for the downlink shared channel scheduling delay and a second index for the acknowledgment feedback delay; and determining the downlink shared channel scheduling delay and the acknowledgment feedback delay based at least in part on the single value.

Aspect 3: The method of aspect 2, wherein determining the downlink shared channel scheduling delay and the acknowledgment feedback delay comprises: performing a first calculation using the single value to determine the downlink shared channel scheduling delay; and performing a second calculation using the single value to determine the acknowledgment feedback delay.

Aspect 4: The method of aspect 2, wherein determining the downlink shared channel scheduling delay and the acknowledgment feedback delay comprises: determining the downlink shared channel scheduling delay and the acknowledgment feedback delay based at least in part on a table comprising a first plurality of downlink shared channel scheduling delay values and a second plurality of acknowledgment feedback delay values, wherein the single value indicates a row of the table corresponding to the downlink shared channel scheduling delay and the acknowledgment feedback delay.

Aspect 5: The method of any of aspects 1 through 4, wherein receiving the downlink control information comprising the downlink control information field comprises: receiving the downlink control information field comprising a first value corresponding to the downlink shared channel scheduling delay, a second value, and a third value, wherein the acknowledgment feedback delay is determined based at least in part on the second value and the third value.

Aspect 6: The method of aspect 5, wherein the downlink control information field comprising the first value, the second value, and the third value is received based at least in part on the downlink shared channel scheduling delay and the acknowledgment feedback delay comprising a number of bandwidth limited low complexity/coverage enhancement transmission time intervals.

Aspect 7: The method of any of aspects 1 through 6, wherein receiving the control message comprises: receiving the control message comprising the indication of the length of the number of bits for the downlink control information field via radio resource control signaling.

Aspect 8: The method of any of aspects 1 through 7, wherein the number of bits is based at least in part on the downlink shared channel scheduling delay and the acknowledgment feedback delay comprising a number of absolute transmission time intervals or comprising a number of bandwidth limited low complexity/coverage enhancement transmission time intervals.

Aspect 9: The method of any of aspects 1 through 8, wherein the number of bits comprises five bits, six bits, or seven bits.

Aspect 10: The method of any of aspects 1 through 9, wherein the downlink shared channel scheduling delay and the acknowledgment feedback delay comprise a number of absolute transmission time intervals, a number of bandwidth limited low complexity/coverage enhancement transmission time intervals, or a combination thereof.

Aspect 11: The method of any of aspects 1 through 10, wherein the UE comprises a machine type communication device.

Aspect 12: A method for wireless communications at a network device, comprising: transmitting, to a UE, a control message comprising an indication of a length of a number of bits for a downlink control information field, the downlink control information field comprising a jointly encoded indication for a downlink shared channel scheduling delay and an acknowledgment feedback delay; transmitting, to the UE based at least in part on the control message, downlink control information comprising the downlink control information field; transmitting, to the UE, a downlink shared channel based at least in part on the downlink shared channel scheduling delay; and receiving, from the UE, acknowledgment feedback based at least in part on the acknowledgment feedback delay.

Aspect 13: The method of aspect 12, wherein transmitting the downlink control information comprising the downlink control information field comprises: transmitting the downlink control information field comprising a single value, the single value calculated based at least in part on a first index for the downlink shared channel scheduling delay and a second index for the acknowledgment feedback delay, wherein the downlink shared channel scheduling delay and the acknowledgment feedback delay are indicated based at least in part on the single value.

Aspect 14: The method of aspect 13, wherein the downlink shared channel scheduling delay and the acknowledgment feedback delay are indicated based at least in part on a table comprising a first plurality of downlink shared channel scheduling delay values and a second plurality of acknowledgment feedback delay values, the single value indicating a row of the table corresponding to the downlink shared channel scheduling delay and the acknowledgment feedback delay.

Aspect 15: The method of any of aspects 12 through 14, wherein transmitting the downlink control information comprising the downlink control information field comprises: transmitting the downlink control information field comprising a first value corresponding to the downlink shared channel scheduling delay, a second value, and a third value, wherein the acknowledgment feedback delay is indicated based at least in part on the second value and the third value.

Aspect 16: The method of aspect 15, wherein the downlink control information field comprising the first value, the second value, and the third value is transmitted based at least in part on the downlink shared channel scheduling delay and the acknowledgment feedback delay comprising a number of bandwidth limited low complexity/coverage enhancement transmission time intervals.

Aspect 17: The method of any of aspects 12 through 16, wherein transmitting the control message comprises: transmitting the control message comprising the indication of the length of the number of bits for the downlink control information field via radio resource control signaling.

Aspect 18: The method of any of aspects 12 through 17, wherein the number of bits is based at least in part on the downlink shared channel scheduling delay and the acknowledgment feedback delay comprising a number of absolute transmission time intervals or comprising a number of bandwidth limited low complexity/coverage enhancement transmission time intervals.

Aspect 19: The method of any of aspects 12 through 18, wherein the number of bits comprises five bits, six bits, or seven bits.

Aspect 20: The method of any of aspects 12 through 19, wherein the downlink shared channel scheduling delay and the acknowledgment feedback delay comprise a number of absolute transmission time intervals, a number of bandwidth limited low complexity/coverage enhancement transmission time intervals, or a combination thereof.

Aspect 21: The method of any of aspects 12 through 20, wherein the UE comprises a machine type communication device.

Aspect 22: An apparatus for wireless communications at a UE, comprising at least one processor; memory coupled with the processor; and instructions stored in the memory and executable by the at least one processor to cause the UE to perform a method of any of aspects 1 through 11.

Aspect 23: An apparatus for wireless communications at a UE, comprising at least one means for performing a method of any of aspects 1 through 11.

Aspect 24: A non-transitory computer-readable medium storing code for wireless communications at a UE, the code comprising instructions executable by at least one processor to perform a method of any of aspects 1 through 11.

Aspect 25: An apparatus for wireless communications at a network device, comprising at least one processor; memory coupled with the processor; and instructions stored in the memory and executable by the at least one processor to cause the network device to perform a method of any of aspects 12 through 21.

Aspect 26: An apparatus for wireless communications at a network device, comprising at least one means for performing a method of any of aspects 12 through 21.

Aspect 27: A non-transitory computer-readable medium storing code for wireless communications at a network device, the code comprising instructions executable by at least one processor to perform a method of any of aspects 12 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), or ascertaining. Also, "determining" can include receiving (such as receiving information), or accessing (such as accessing data in a memory). Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving, from a network device, a control message comprising an indication of a length of a number of bits for a downlink control information field, the downlink control information field comprising a jointly encoded indication for a downlink shared channel scheduling delay and an acknowledgment feedback delay, wherein the downlink shared channel scheduling delay and the acknowledgment feedback delay comprise a number of absolute transmission time intervals, a number of bandwidth limited low complexity/coverage enhancement transmission time intervals, or a combination thereof;
    receiving, from the network device based at least in part on the control message, downlink control information comprising the downlink control information field;
    receiving, from the network device, a downlink shared channel transmission based at least in part on the downlink shared channel scheduling delay; and
    transmitting, to the network device, acknowledgment feedback based at least in part on the acknowledgment feedback delay.

2. The method of claim 1, wherein receiving the downlink control information comprising the downlink control information field comprises:
    receiving the downlink control information field comprising a single value, wherein the single value is based at least in part on a first index for the downlink shared channel scheduling delay and a second index for the acknowledgment feedback delay; and
    determining the downlink shared channel scheduling delay and the acknowledgment feedback delay based at least in part on the single value.

3. The method of claim 2, wherein determining the downlink shared channel scheduling delay and the acknowledgment feedback delay comprises:
    performing a first calculation using the single value to determine the downlink shared channel scheduling delay; and
    performing a second calculation using the single value to determine the acknowledgment feedback delay.

4. The method of claim 2, wherein determining the downlink shared channel scheduling delay and the acknowledgment feedback delay comprises:
    determining the downlink shared channel scheduling delay and the acknowledgment feedback delay based at least in part on a table comprising a first plurality of downlink shared channel scheduling delay values and a second plurality of acknowledgment feedback delay values, wherein the single value indicates a row of the table corresponding to the downlink shared channel scheduling delay and the acknowledgment feedback delay.

5. The method of claim 1, wherein receiving the downlink control information comprising the downlink control information field comprises:
    receiving the downlink control information field comprising a first value corresponding to the downlink shared channel scheduling delay, a second value, and a third value, wherein the acknowledgment feedback delay is determined based at least in part on the second value and the third value.

6. The method of claim 5, wherein the downlink control information field comprising the first value, the second value, and the third value is received based at least in part on the downlink shared channel scheduling delay and the acknowledgment feedback delay comprising the number of bandwidth limited low complexity/coverage enhancement transmission time intervals.

7. The method of claim 1, wherein receiving the control message comprises:
receiving the control message comprising the indication of the length of the number of bits for the downlink control information field via radio resource control signaling.

8. The method of claim 1, wherein the number of bits is based at least in part on the downlink shared channel scheduling delay and the acknowledgment feedback delay comprising the number of absolute transmission time intervals or comprising the number of bandwidth limited low complexity/coverage enhancement transmission time intervals.

9. The method of claim 1, wherein the number of bits comprises five bits, six bits, or seven bits.

10. The method of claim 1, wherein the UE comprises a machine type communication device.

11. A method for wireless communications at a network device, comprising:
transmitting, to a user equipment (UE), a control message comprising an indication of a length of a number of bits for a downlink control information field, the downlink control information field comprising a jointly encoded indication for a downlink shared channel scheduling delay and an acknowledgment feedback delay, wherein the downlink shared channel scheduling delay and the acknowledgment feedback delay comprise a number of absolute transmission time intervals, a number of bandwidth limited low complexity/coverage enhancement transmission time intervals, or a combination thereof;
transmitting, to the UE based at least in part on the control message, downlink control information comprising the downlink control information field;
transmitting, to the UE, a downlink shared channel transmission based at least in part on the downlink shared channel scheduling delay; and
receiving, from the UE, acknowledgment feedback based at least in part on the acknowledgment feedback delay.

12. An apparatus for wireless communications at a user equipment (UE), comprising:
at least one processor; and
memory coupled to the at least one processor, the memory storing instructions executable by the at least one processor to cause the UE to:
receive, from a network device, a control message comprising an indication of a length of a number of bits for a downlink control information field, the downlink control information field comprising a jointly encoded indication for a downlink shared channel scheduling delay and an acknowledgment feedback delay, wherein the downlink shared channel scheduling delay and the acknowledgment feedback delay comprise a number of absolute transmission time intervals, a number of bandwidth limited low complexity/coverage enhancement transmission time intervals, or a combination thereof;
receive, from the network device based at least in part on the control message, downlink control information comprising the downlink control information field;
receive, from the network device, a downlink shared channel transmission based at least in part on the downlink shared channel scheduling delay; and
transmit, to the network device, acknowledgment feedback based at least in part on the acknowledgment feedback delay.

13. The apparatus of claim 12, wherein the instructions to receive the downlink control information comprising the downlink control information field are executable by the at least one processor to cause the UE to:
receive the downlink control information field comprising a single value, wherein the single value is based at least in part on a first index for the downlink shared channel scheduling delay and a second index for the acknowledgment feedback delay; and
determine the downlink shared channel scheduling delay and the acknowledgment feedback delay based at least in part on the single value.

14. The apparatus of claim 13, wherein the instructions to determine the downlink shared channel scheduling delay and the acknowledgment feedback delay are executable by the at least one processor to cause the UE to:
perform a first calculation using the single value to determine the downlink shared channel scheduling delay; and
perform a second calculation using the single value to determine the acknowledgment feedback delay.

15. The apparatus of claim 13, wherein the instructions to determine the downlink shared channel scheduling delay and the acknowledgment feedback delay are executable by the at least one processor to cause the UE to:
determine the downlink shared channel scheduling delay and the acknowledgment feedback delay based at least in part on a table comprising a first plurality of downlink shared channel scheduling delay values and a second plurality of acknowledgment feedback delay values, wherein the single value indicates a row of the table corresponding to the downlink shared channel scheduling delay and the acknowledgment feedback delay.

16. The apparatus of claim 12, wherein the instructions to receive the downlink control information comprising the downlink control information field are executable by the at least one processor to cause the UE to:
receive the downlink control information field comprising a first value corresponding to the downlink shared channel scheduling delay, a second value, and a third value, wherein the acknowledgment feedback delay is determined based at least in part on the second value and the third value.

17. The apparatus of claim 16, wherein the downlink control information field comprising the first value, the second value, and the third value is received based at least in part on the downlink shared channel scheduling delay and the acknowledgment feedback delay comprising the number of bandwidth limited low complexity/coverage enhancement transmission time intervals.

18. The apparatus of claim 12, wherein the instructions to receive the control message are executable by the at least one processor to cause the UE to:
receive the control message comprising the indication of the length of the number of bits for the downlink control information field via radio resource control signaling.

19. The apparatus of claim 12, wherein the number of bits is based at least in part on the downlink shared channel scheduling delay and the acknowledgment feedback delay comprising the number of absolute transmission time intervals or comprising the number of bandwidth limited low complexity/coverage enhancement transmission time intervals.

20. The apparatus of claim 12, wherein:
the number of bits comprises five bits, six bits, or seven bits.

21. The apparatus of claim 12, wherein the UE comprises a machine type communication device.

22. An apparatus for wireless communications at a network device, comprising:
at least one processor; and
memory coupled to the at least one processor, the memory storing instructions executable by the at least one processor to cause the network device to:
transmit, to a user equipment (UE), a control message comprising an indication of a length of a number of bits for a downlink control information field, the downlink control information field comprising a jointly encoded indication for a downlink shared channel scheduling delay and an acknowledgment feedback delay, wherein the downlink shared channel scheduling delay and the acknowledgment feedback delay comprise a number of absolute transmission time intervals, a number of bandwidth limited low complexity/coverage enhancement transmission time intervals, or a combination thereof;
transmit, to the UE based at least in part on the control message, downlink control information comprising the downlink control information field;
transmit, to the UE, a downlink shared channel transmission based at least in part on the downlink shared channel scheduling delay; and
receive, from the UE, acknowledgment feedback based at least in part on the acknowledgment feedback delay.

23. The apparatus of claim 22, wherein the downlink control information field comprises a single value, the single value calculated based at least in part on a first index for the downlink shared channel scheduling delay and a second index for the acknowledgment feedback delay, wherein the downlink shared channel scheduling delay and the acknowledgment feedback delay are indicated based at least in part on the single value.

24. The apparatus of claim 23, wherein the downlink shared channel scheduling delay and the acknowledgment feedback delay are indicated based at least in part on a table comprising a first plurality of downlink shared channel scheduling delay values and a second plurality of acknowledgment feedback delay values, the single value indicating a row of the table corresponding to the downlink shared channel scheduling delay and the acknowledgment feedback delay.

25. The apparatus of claim 22, wherein the downlink control information field comprises a first value corresponding to the downlink shared channel scheduling delay, a second value, and a third value, wherein the acknowledgment feedback delay is indicated based at least in part on the second value and the third value.

26. The apparatus of claim 25, wherein the downlink control information field comprising the first value, the second value, and the third value is transmitted based at least in part on the downlink shared channel scheduling delay and the acknowledgment feedback delay comprising the number of bandwidth limited low complexity/coverage enhancement transmission time intervals.

27. The apparatus of claim 22, wherein the control message comprising the indication of the length of the number of bits for the downlink control information field is transmitted via radio resource control signaling.

28. The apparatus of claim 22, wherein the number of bits is based at least in part on the downlink shared channel scheduling delay and the acknowledgment feedback delay comprising the number of absolute transmission time intervals or comprising the number of bandwidth limited low complexity/coverage enhancement transmission time intervals.

* * * * *